United States Patent
Rao et al.

(10) Patent No.: US 6,674,756 B1
(45) Date of Patent: Jan. 6, 2004

(54) MULTI-SERVICE NETWORK SWITCH WITH MULTIPLE VIRTUAL ROUTERS

(75) Inventors: Ramakrishna Rao, San Jose, CA (US); Richard Schunk, Norfolk, MA (US); Charlie Ghahremani, San Jose, CA (US)

(73) Assignee: Alcatel, Paris (FR)

(*) Notice: Subject to any disclaimer, the term of this patent is extended or adjusted under 35 U.S.C. 154(b) by 0 days.

(21) Appl. No.: 09/511,793

(22) Filed: Feb. 23, 2000

Related U.S. Application Data

(60) Provisional application No. 60/121,270, filed on Feb. 23, 1999, provisional application No. 60/121,271, filed on Feb. 23, 1999, provisional application No. 60/121,272, filed on Feb. 23, 1999, provisional application No. 60/121,273, filed on Feb. 23, 1999, provisional application No. 60/121,274, filed on Feb. 23, 1999, provisional application No. 60/121,275, filed on Feb. 23, 1999, provisional application No. 60/121,276, filed on Feb. 23, 1999, provisional application No. 60/121,277, filed on Feb. 23, 1999, provisional application No. 60/121,278, filed on Feb. 23, 1999, provisional application No. 60/121,279, filed on Feb. 23, 1999, provisional application No. 60/121,589, filed on Feb. 23, 1999, provisional application No. 60/121,590, filed on Feb. 23, 1999, provisional application No. 60/121,591, filed on Feb. 23, 1999, provisional application No. 60/121,592, filed on Feb. 23, 1999, and provisional application No. 60/121,593, filed on Feb. 23, 1999.

(51) Int. Cl.[7] .................................................. H04L 12/56
(52) U.S. Cl. .............................. 370/395.21; 709/229
(58) Field of Search .............................. 370/229, 230, 370/230.1, 395.1, 395.2, 395.21; 709/229, 240

(56) References Cited

U.S. PATENT DOCUMENTS

| | | |
|---|---|---|
| 5,153,877 A | 10/1992 | Esaki et al. |
| 5,193,086 A | 3/1993 | Satomi et al. |
| 5,251,209 A | 10/1993 | Jurkevich et al. |
| 5,365,510 A | 11/1994 | Nicholson et al. |
| 5,436,886 A | 7/1995 | McGill |
| 5,463,620 A | 10/1995 | Sriram |
| 5,490,252 A | 2/1996 | Macera et al. |
| 5,509,123 A | 4/1996 | Dobbins et al. |
| 5,550,816 A * | 8/1996 | Hardwick et al. .......... 370/397 |
| 5,583,857 A | 12/1996 | Soumiya et al. |
| 5,596,569 A | 1/1997 | Madonna et al. |
| 5,625,677 A | 4/1997 | Feiertag et al. |
| 5,687,167 A * | 11/1997 | Bertin et al. ................. 370/254 |

(List continued on next page.)

FOREIGN PATENT DOCUMENTS

| | | |
|---|---|---|
| EP | 0 926859 A2 | 6/1999 |
| WO | WO 98/39879 | 9/1998 |
| WO | WO 99/00945 | 1/1999 |
| WO | WO 99/00949 | 1/1999 |
| WO | WO 99/07078 | 2/1999 |
| WO | WO 00/33204 | 6/2000 |

OTHER PUBLICATIONS

Nortel Networks, "VPN Breakthrough: Virtual IP Netowrking," White Paper Part No. WP 532–3299EC–A, Feb. 1999, pp. 1–9, Nortel Networks, USA. <URL:http//www.nortel-networks.com/solutions/wan/collateral/vipn_wp.pdf>.

*Primary Examiner*—Hassan Kizou
*Assistant Examiner*—D Levitan
(74) *Attorney, Agent, or Firm*—David A. Cordeir; Scot A. Reader

(57) ABSTRACT

A physical network switch partitioned into a plurality of virtual routers (VRs) where each VR has allocated to it a set of resources and routing tables. The system resources are not tied to a particular network interface, allowing them to be flexibly partitioned among the various VRs. Each VR may also be partitioned into multiple virtual private networks (VPNs) for controlling access to certain portions of the VR. Access is controlled by filtering software that filters traffic directed to the VR based on criteria such as source and/or destination addresses.

19 Claims, 34 Drawing Sheets

U.S. PATENT DOCUMENTS

| | | | |
|---|---|---|---|
| 5,740,175 A | | 4/1998 | Wakeman et al. |
| 5,852,655 A | | 12/1998 | McHale et al. |
| 5,923,643 A | | 7/1999 | Higgins et al. |
| 5,951,644 A | | 9/1999 | Creemer |
| 5,953,338 A | * | 9/1999 | Ma et al. ............... 370/395.21 |
| 5,959,972 A | | 9/1999 | Hamami |
| 5,982,748 A | * | 11/1999 | Yin et al. ................... 370/232 |
| 6,069,895 A | * | 5/2000 | Ayandeh ..................... 370/399 |
| 6,085,238 A | * | 7/2000 | Yuasa et al. ................ 709/223 |
| 6,108,304 A | * | 8/2000 | Abe et al. ................... 370/232 |
| 6,178,423 B1 | | 1/2001 | Douceur et al. |
| 6,202,170 B1 | | 3/2001 | Busschbach et al. |
| 6,304,906 B1 | | 10/2001 | Bhatti et al. |
| 6,308,282 B1 | | 10/2001 | Huang et al. |
| 6,314,085 B1 | | 11/2001 | Saranka |
| 6,338,112 B1 | | 1/2002 | Wipfel et al. |
| 6,339,595 B1 | | 1/2002 | Rekhter et al. |
| 6,377,550 B1 | | 4/2002 | Prasad |
| 6,442,164 B1 | | 8/2002 | Wu |
| 6,449,643 B1 | | 9/2002 | Hyndman et al. |
| 6,449,646 B1 | | 9/2002 | Sikora et al. |
| 6,449,647 B1 | | 9/2002 | Colby et al. |
| 6,459,681 B1 | * | 10/2002 | Oliva ......................... 370/232 |
| 6,463,062 B1 | * | 10/2002 | Buyukkoc et al. ....... 370/395.1 |
| 6,515,964 B1 | * | 2/2003 | Cheung et al. ............. 370/230 |

* cited by examiner

IP Route Table:
Total Routes: 32

| Destination | Subnet Mask | NextHop | Owner | Cost | |
|---|---|---|---|---|---|
| 0.0.0.0 | 0.0.0.0 | 206.169.142.9 | STATIC | 1 | |
| 0.0.0.0 | 0.0.0.0 | 206.169.114.17 | STATIC | 2 | |
| 0.0.0.0 | 0.0.0.0 | 10.1.205.18 | OSPFE | 11 | |
| 10.180.180.0 | 255.255.255.248 | 10.1.205.18 | OSPFE | 11 | |
| 10.3.1.16 | 255.255.255.240 | 10.1.130.2 | OSPFE | 20 | :2 |
| 10.2.215.64 | 255.255.255.240 | 10.1.130.1 | OSPF1 | 20 | |
| 10.3.215.64 | 255.255.255.240 | 10.1.130.2 | OSPF1 | 20 | |
| 10.2.215.0 | 255.255.255.192 | 10.1.130.1 | OSPF2 | 30 | |
| 10.3.215.0 | 255.255.255.192 | 10.1.130.2 | OSPF2 | 30 | |
| 10.3.215.128 | 255.255.255.192 | 10.1.130.2 | OSPF2 | 130 | |
| 10.1.54.0 | 255.255.255.0 | DIRECT | DIAL-POOL 1 | | |
| 10.131.71.0 | 255.255.255.0 | 10.1.205.18 | OSPFE | 11 | |
| 10.1.0.0 | 255.255.0.0 | DIRECT | LOCAL | 1 | |
| 10.181.0.0 | 255.255.0.0 | 10.1.205.18 | OSPFE | 11 | |
| 10.87.0.0 | 255.255.0.0 | 10.1.205.18 | OSPFE | 11 | |
| 10.89.0.0 | 255.255.0.0 | 10.1.205.18 | OSPFE | 11 | |
| 10.91.0.0 | 255.255.0.0 | 10.1.205.18 | OSPFE | 12 | |
| 10.200.0.0 | 255.255.0.0 | 10.1.205.18 | OSPFE | 20 | |
| 10.77.0.0 | 255.255.0.0 | 10.1.51.200 | OSPF1 | 110 | |
| 11.22.33.0 | 255.255.255.0 | 10.1.16.16 | OSPF1 | 110 | |
| 206.169.114.16 | 255.255.255.252 | DIRECT | LOCAL | 1 | |
| 206.169.114.152 | 255.255.255.248 | DIRECT | DIAL-POOL 1 | | |
| 206.169.114.136 | 255.255.255.248 | DIRECT | DIAL-POOL 1 | | |

Press Enter to Continue, Any other key followed by Enter to Abort:

Fig. 5

PRI-SCM: 1.1>=2:netman:ip#_view ipf
IP Forwarding Table:
Total IPF table entries: 12

| Destination | Subnet Mask | Nexthop | Type | Flags (*) |
|---|---|---|---|---|
| 10.3.238.1 | 225.255.255.255 | | SPORT | SD(r) |
| 10.1.6.36 | 225.255.255.255 | | SPORT | M |
| 10.1.6.35 | 225.255.255.255 | | SPORT | M |
| 10.1.6.34 | 225.255.255.255 | | SPORT | M |
| 10.1.6.33 | 225.255.255.255 | | SPORT | M |
| 10.1.6.32 | 225.255.255.255 | | SPORT | M |
| 10.1.6.31 | 225.255.255.255 | | SPORT | M |
| 10.2.238.1 | 225.255.255.255 | | SPORT | SD (1) |
| 10.1.6.30 | 225.255.255.255 | | SPORT | SD (1) |
| 10.3.0.0 | 225.255.0.0 | | SPORT | PD (r) |
| 10.2.0.0 | 225.255.0.0 | | SPORT | PD (l) |
| 10.1.0.0 | 225.255.0.0 | | SPORT | PD (l) |
| 0.0.0.0 | 0.0.0.0 | 206.169.142.9 | SPORT | R |

(*) D: Direct (and l=local card only, r=remote card only), S: System i/f,
R: Remote, P: Supernet, F:Default, and M: Mgmt.

Actual IPF Table Entries: 12

FIG. 6

| Total IP Cache Entries: 3 | | | | |
|---|---|---|---|---|
| Destination 104 | Source 106 | Out Port 108 | Header 110 | |
| 207.200.77.45 | 206.169.114.138 | Fr.1.5.2.3.1 | 08001000cca97211 | |
| 206.169.114.142 | 10.1.1.25 | Mo.1.3.1.1.29 | 0800201dcca9728e | |
| 198.41.0.5 | 206.169.114.138 | Fr.1.5.2.3.1 | 08000000cea97211 | |

IP ARP Table:

| IP Address /200 | MAC Address /202 | Physical Port /204 | Type(*) /206 |
|---|---|---|---|
| 10.1.1.101 | 00-ff-4a-3d-2f-1a | En.1.3.1.1.1. | S |
| 10.1.5.100 | 00-ff-ff-01-ff-20 | En.1.3.2.1.1. | D |
| 150.140.140.30 | 08-00-09-ff-65-ff | En.1.3.1.1.14 | LB |
| 147.128.128.60 | 08-00-09-ff-38-38 | En.1.3.1.1.10 | D |
| 10.1.5.109 | 00-ff-ff-04-02-ff | En.1.3.2.1.8 | S |

(*) R: Rmt, L: Lcl, D: Dyn, S: Stat, P: Pt2Pt, T: Route and B: Bcast

Total Arp Table Entries: 5

| QoA LEVEL | ACCESS THRESHOLD |
|---|---|
| 1 | 100 % |
| 2 | 75 % |
| 3 | 50 % |
| 4 | 25 % |

MODEM RESOURCES

- 336 — VR ID = 111
- 338 — Max Local Resources = 32
- 340 — Max Global Resources = 32
- 342 — Current Local Resources = 29
- 344 — Current Global Resources = 29

346 —

| QOA | LOCAL QOA | GLOBAL QOA | ACCEPT LOCAL | ACCEPT GLOBAL |
|-----|-----------|------------|--------------|---------------|
|     | 348       | 350        | 352          | 354           |
| 1   | 0         | 0          | YES          | YES           |
| 2   | 8         | 8          | YES          | YES           |
| 3   | 16        | 16         | YES          | YES           |
| 4   | 24        | 24         | YES          | YES           |

IP VPN Sessions:

| ID | VPN-ID | Source-Addr | Source-Mask | Dest-Addr | Dest-Mask |
|----|--------|-------------|-------------|-----------------|-----------------|
| 1  | 111    | any         | any         | 10.1.0.0        | 255.255.0.0     |
| 2  | any    | 10.1.0.0    | 255.255.0.0 | 208.227.214.0   | 255.255.255.0   |
| 3  | any    | 10.1.0.0    | 255.255.0.0 | 10.1.0.0        | 255.255.0.0     |
| 4  | any    | 10.1.0.0    | 255.255.0.0 | 206.169.114.128 | 255.255.255.192 |
| 5  | any    | any         | any         | 10.1.0.0        | 255.255.0.0     |
| 6  | any    | 10.1.0.0    | 255.255.0.0 | any             | any             |
| 7  | any    | any         | any         | any             | any             |

Fig. 18

```
PRI-SCM:1.2>=14:netman:ip#
IP VPN Rules:
ID  Pri  Action  IP-Proto  App-Proto  SessCnt  Pkt Count
     258  260     262       264        266      268
1   1    Fwd     tcp       ftp        5        3939981
2   1    Drop    all       -          2        3          
PRI-SCM:1.2>=14:netman:ip#
```

256 points to the ID/header row; 254 labels the box.

*Fig. 19*

```
PRI-SCM:1.1>=3:netman:ip# view ppn-filter
IP VPN List of rules attached to sessions:
SessID    Rule List (In order of priority)
--------  ---------------------------------
1         1
2         1
3         1
4         1
5         2
6         2
7         1
PRI-SCM:1.1>=4:netman:ip#
```

Fig. 20

FPA

| | CHASS | SLOT | PM | CONT | PORT NUM |
|---|---|---|---|---|---|

FIG. 31

PPA

| | CHASS | SLOT | PM | LINK | CHAN NUM |
|---|---|---|---|---|---|

FIG. 32

INPUT PORT FORMAT

| bit | 28 27 | 24 23 22 21 | 18 17 | 12 11 | |
|---|---|---|---|---|---|
| | LAN TYPE / SPARE / SPARE / SPARE | PORT TYPE | CHASS | CARD | CONTROLLER | PORT |

OUTPUT PORT FORMAT

| Bits | Field |
|---|---|
| | PORT |
| 12 11 | |
| | CONTROLLER |
| 18 17 | |
| | CARD |
| 23 22 21 | |
| | CHASS |
| 24 | SPARE |
| 25 | PARE |
| 26 | SPARE |
| 27 | Multi Cast |
| 28 | CRC |
| | Release |

| Port Addr Range | Type | Chass | Card | Control |
|---|---|---|---|---|
| 0-19 | Well Known Internal Multicast Address | NA | NA | 0 |
| 20-18 | Well Known Internal Unicast Address | NA | Card Num | 0 |
| 40-79 | Well Known External Multicast Address | NA | NA | 0 |
| 80-511 | Dynamic External Multicast Address | NA | NA | 0 |
| 512-2048 | Remote Port Address | Chass Num | Card Num | 0 |

FIG. 35

MULTI-SERVICE NETWORK SWITCH WITH MULTIPLE VIRTUAL ROUTERS

CROSS-REFERENCE TO RELATED APPLICATIONS

This application claims priority of U.S. provisional applications Nos. 60/121,270; 60/121,271; 60/121,272; 60/121,273; 60/121,274; 60/121,275; 60/121,276; 60/121,277; 60/121,278; 60/121,279; 60/121,589; 60/121,590; 60/121,591; 60/121,592; and 60/121,593 filed on Feb. 23, 1999, the contents of all of which are incorporated herein by reference.

FIELD OF THE INVENTION

The present invention relates generally to network switches, and more particularly, to a multi-service network switch capable of emulating multiple routers within the single switch.

BACKGROUND OF THE INVENTION

Today's network service providers face extraordinary challenges. Traffic levels are rapidly increasing. Both consumers and corporations are demanding higher access rates and staying on the Internet longer while looking for predictable performance and stringent service-level guarantees. This puts direct demands on Internet Service Providers (ISPs) to provide larger capacity and higher speed at their point of presence (POP) locations, preferably without compromising performance.

Just to maintain acceptable performance, service providers are adding support for more users, more traffic, and more transactions, preferably without introducing bottlenecks or compromising network availability. Many network-based business transactions are time-critical and typically cannot tolerate undue delay or disruption.

In addition to the challenge of growing traffic levels is the challenge of growing diversity of network technology. Users may access the public infrastructure, for example, over dial-up connections, ISDN links, leased lines, frame relays, and ATM virtual circuits. They may use voice-grade modems, cable modems, a variety of xDSL modems, or other modems. Within the infrastructure, a service provider's POP may attach to the core network and to other devices in the POP using, for example, ATM, frame relay, or Ethernet.

Supporting each type of network technology in a traditional manner means that the ISPs typically add separate access servers, access routers, and/or stand alone LAN switches, generally resulting in an increase in cost and management complexities for the ISP.

While delivering reliable, responsible services, service providers must also simultaneously build revenue and cut costs, without sacrificing service quality. To succeed, service providers generally need management simplification and economies of scale so that per-user expenses drop as the number of users rises. Service providers also need new, value-added services that differentiate them from the competition, take them into new markets, and boost revenue from existing customers.

One of the value-added services that service providers may provide to differentiate themselves from their competitors is corporate outsourcing and dial network wholesaling. With corporate outsourcing, a corporation outsources its WAN network to third party service providers for remote user access to the company's Intranet. With dial network wholesaling, a service provider resells its ports to other service providers. Because the success of corporate outsourcing and dial network wholesaling are generally highly dependent on security, the service provider traditionally purchases a separate POP for each outsourced network or reselling service provider.

Accordingly, there is a need for a network switch capable of providing fault-tolerant and efficient services that will accommodate the increase in the number and the variety of network traffic. It is also desirable to have a system and a method for a private, secure environment for multiple sharing subscribers without the addition of a separate POP per subscriber.

SUMMARY OF THE INVENTION

The present invention is directed to a multi-service network switch capable of providing multiple services including modem and ISDN services, frame relay support, LAN interfaces, and layer-2 and layer-3 switching, from a single platform. According to one embodiment of the invention, the switch supports dial network wholesaling where dial ports are resold to other ISPs, by partitioning the switch into multiple virtual routers. Each virtual router preferably has its own set of resources (e.g. ISDN or modem resources) and a routing table proprietary to the virtual router. Each virtual router therefore preferably functions as a separate router in an independent and self-contained manner.

According to one aspect of the invention, the switch creates a plurality of virtual routers with a unique virtual router identifier, and allocates resources to each of them. The allocated resources are proprietary to each virtual router. In addition, the switch creates for each virtual router a routing table and an IP interface, and enables them for receiving and forwarding user traffic.

According to another aspect of the invention, each virtual router is partitioned into virtual private networks for further controlling access to the network. A virtual private network is created via filters where each filter is associated with a filtering criteria and an action to be taken upon a match of the filtering criteria by a block of data directed to the virtual router.

BRIEF DESCRIPTION OF THE DRAWINGS

These and other features, aspects and advantages of the present invention will be more fully understood when considered with respect to the following detailed description, appended claims and accompanying drawings wherein:

FIG. 5 is a schematic layout diagram of a routing table;

FIG. 6 is a schematic layout diagram of a forwarding table;

FIG. 7 is a schematic layout diagram of an IP cache;

FIG. 8 is a schematic layout diagram of an ARP table;

FIG. 13 is a schematic layout diagram of a quality of access table;

FIG. 15 is a schematic layout diagram of a modem resource table;

FIG. 18 is a schematic layout diagram of a sessions table including various virtual private network sessions;

FIG. 19 is a schematic layout diagram of a rules table including various virtual private network rules;

FIG. 20 is a schematic layout diagram of a filter table including various virtual private network filters;

FIG. 31 is a schematic layout diagram of a forwarding port address;

FIG. 32 is a schematic layout diagram of a physical port address;

FIG. 33 is a schematic layout diagram of an input port information;

FIG. 34 is a schematic layout diagram of an output port information;

FIG. 35 is a schematic layout diagram of virtual address port assignments; and

DETAILED DESCRIPTION OF THE INVENTION

I. Multi-Service Network Switch System Architecture

Figure 1:
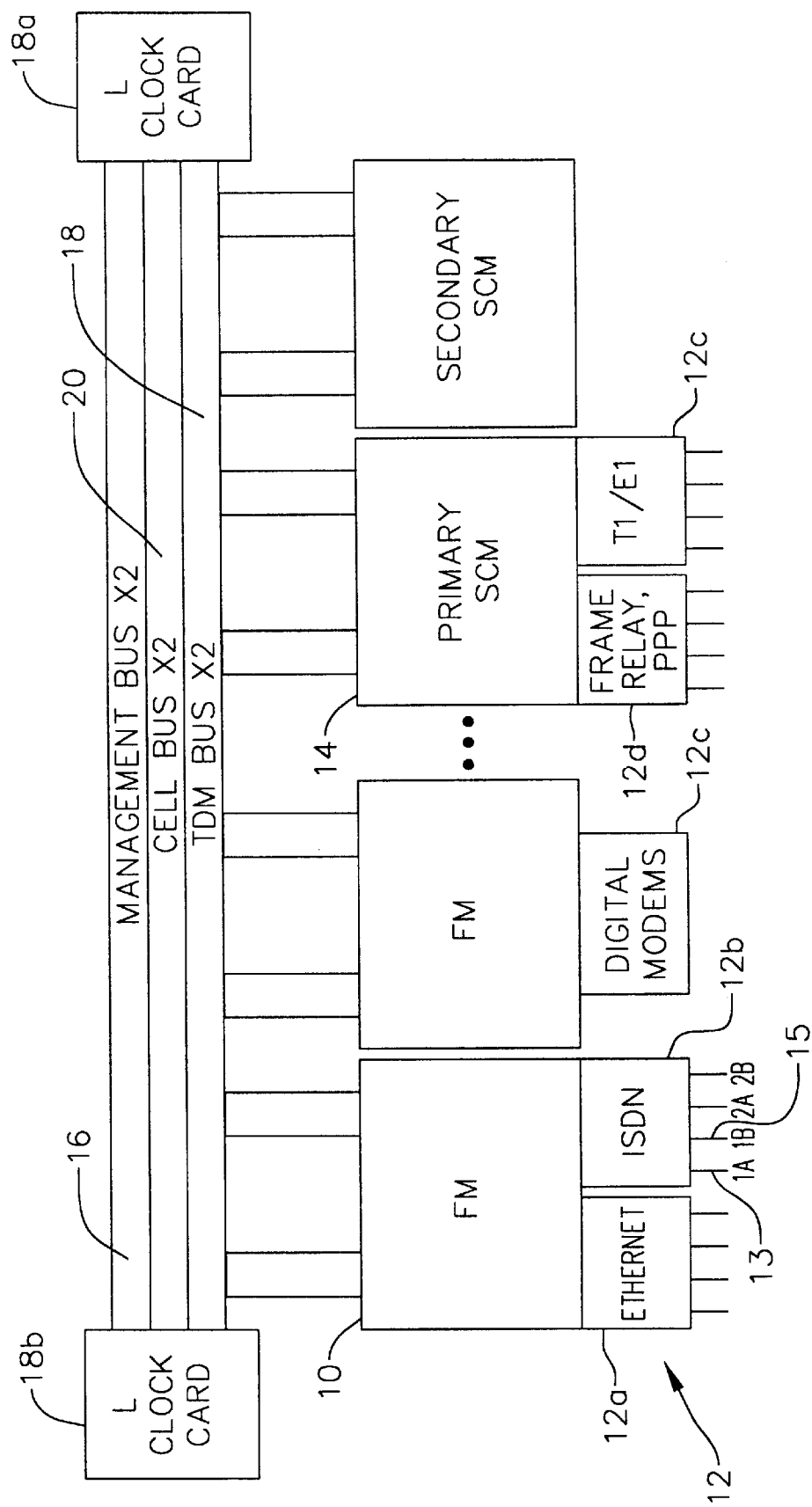
FIG. 1 is a schematic block diagram of a multi-service network switch according to one embodiment of the invention.

FIG. 1 is a schematic block diagram of a multi-service network switch (also referred to as the "chassis" or "system") according to one embodiment of the invention. Each slot on the switch preferably accommodates a single interface module (a card), referred to as a forwarding module (FM) 10. Each FM 10 preferably includes the on-board intelligence, route forwarding,, and route processing information for distributed packet forwarding, as is described in further detail below.

One type of FM, referred to as a system control module (SCM) 14, hosts a route server and acts as the control point for network management. The SCM 14 also performs all the typical functions of an FM 10.

The switch includes at least two SCMs for fault tolerance, a primary SCM and a secondary SCM. The primary SCM is chosen at system startup, and announced to all the other FMs 10. The primary SCM preferably selects the secondary SCM as backup. If the primary SCM fails, the secondary SCM automatically takes over as primary, preferably with no loss of information and no interruption of service.

Each FM 10 may have associated application-specific daughter cards, referred to as personality modules (PMs) 12, for additional physical line interfaces or support hardware. In the preferred embodiment, there are one or two PMs associated with each FM. Exemplary PMs 12 include Ethernet switch PMs 12a, primary rate interface PMs 12b, digital modem server PMs 12c, and serial data interface PMs 12d. Together, the FMs 10 and PMs 12 allow an ISP to provide a wide range of services and support a wide range of applications, all within a single platform.

The Ethernet switch PM 12a enables a LAN connection to a public network, such as the Internet. This module is typically used to connect server farms, intranets, and Web servers to the Internet. According to one embodiment of the invention, the Ethernet switch PM 12a provides twelve 10 Mb Ethernet ports and two 10/100 Mb auto-sensing Ethernet/fast Ethernet ports.

The primary rate interface (PRI) PM 12b provides dial-up connections to the Internet. This module may be provided in software for either T1/E1 links or PRI ISDN links. The PRI PM 12b provides redundant connections for automatic protection switching on every port. Port "A" 13 is assigned as the active primary port and Port "B" 15 is assigned as the live backup port.

The digital modem server PM 12c provides dial-up access for modem calls. According to one embodiment of the invention, each digital modem server PM 12c provides a modem pool of 32 modems. The digital modem server PM 12c preferably has no physical connectors. Thus, incoming calls are routed via the backplane to the FM 10 on which the digital modem server PM 12c is connected. The available modems are allocated to the incoming calls based on resource availability criteria such as quality of access and virtual router ID. If a call is capable of being served, the call is assigned randomly to one of the available modems in the modem pool regardless of the FM 10 in which the call came in.

The serial data interface PM 12d enables serial synchronous communication. The serial data interface PM 12d supports a total of four links, for example, three frame relay and one Ethernet link, or four frame relay links and no Ethernet links. The link layer on the serial data interface PM 12d is preferably frame relay, and it typically connects to local routers or external equipment for connections to ISPs or service providers.

In addition to the application specific PMs 12d, dedicated FMs 10 may also enable the ISPs to provide a wide range of services. Dedicated FMs are preferably fixed configuration modules with processing power and functions hardwired onto the module. Exemplary dedicated FMs include digital modem server FMs and WAN line interface FMs. A WAN line interface FM provides channelized T1 or primary rate ISDN access to the switch. A digital modem server FM provides dial-up access for modem calls. A digital modem server FM typically provides 32 modems, but with the addition of a digital modem server PM 12c, it may provide up to 64 modems.

The switch preferably includes a redundant bus architecture for interconnecting the FMs 10 and the SCMs 14. This bus architecture preferably provides two (right and left) management busses 16, two (right and left) time-division multiplexed (TDM) busses 18, and two (right and left) cell/ATM busses 20, on the switch's backplane. In one embodiment of the invention, all cards use the right management and TDM busses by default. All cards in even slots use the left cell bus by default, and all cards in odd slots use the right cell bus by default. The redundant bus architecture enables traffic to be automatically switched to the remaining bus to ensure continued service. When operation of the failed bus is restored, the traffic is preferably automatically switched back to the newly restored bus.

The management busses 16 provide internal system communication for monitoring various system components. For instance, the management busses carry messages for power-up sequencing, module status, and other hardware management functions.

The TDM busses 18 provide communication for the digital modem server PMs 12c. According to one embodiment of the invention, the TDM busses 18 support over 2,000 DS0 connections and share the traffic load communicated on them.

The cell busses 20 move user traffic between the FMs 10, and carry internal protocol and control messages using multicast circuitry.

In addition to the above, the switch also includes two clock cards, a right or first clock card 18a, and a left or second clock card 18b, either of which may be designated as an active primary clock card or a redundant backup clock card. The right clock card 18a monitors the right TDM and cell busses, and the left clock card 18b monitors the left TDM and cell busses.

Both clock cards periodically check their respective TDM and cell busses, as well as the status of system fan trays, system fans, and presence and type of power supplies. The clock cards then periodically broadcast to all the FMs 10 a chassis status message via its management bus 16.

The clock cards are preferably provisioned with at least one clock source in order for the switch to receive dial-up calls. The clock preferably forces the transmitted and received bits to remain synchronized. According to one embodiment of the invention, the switch supports up to five reference clocks, one live primary, one secondary for redundancy, and up to three alternatives. The switch may derive the reference clock from either an external source or an internal system clock. If the input from one source becomes unacceptable, the clock card automatically switches to a backup clock source. Similarly, if a clock card or TDM bus fails, the other card or bus takes over.

Figure 2:
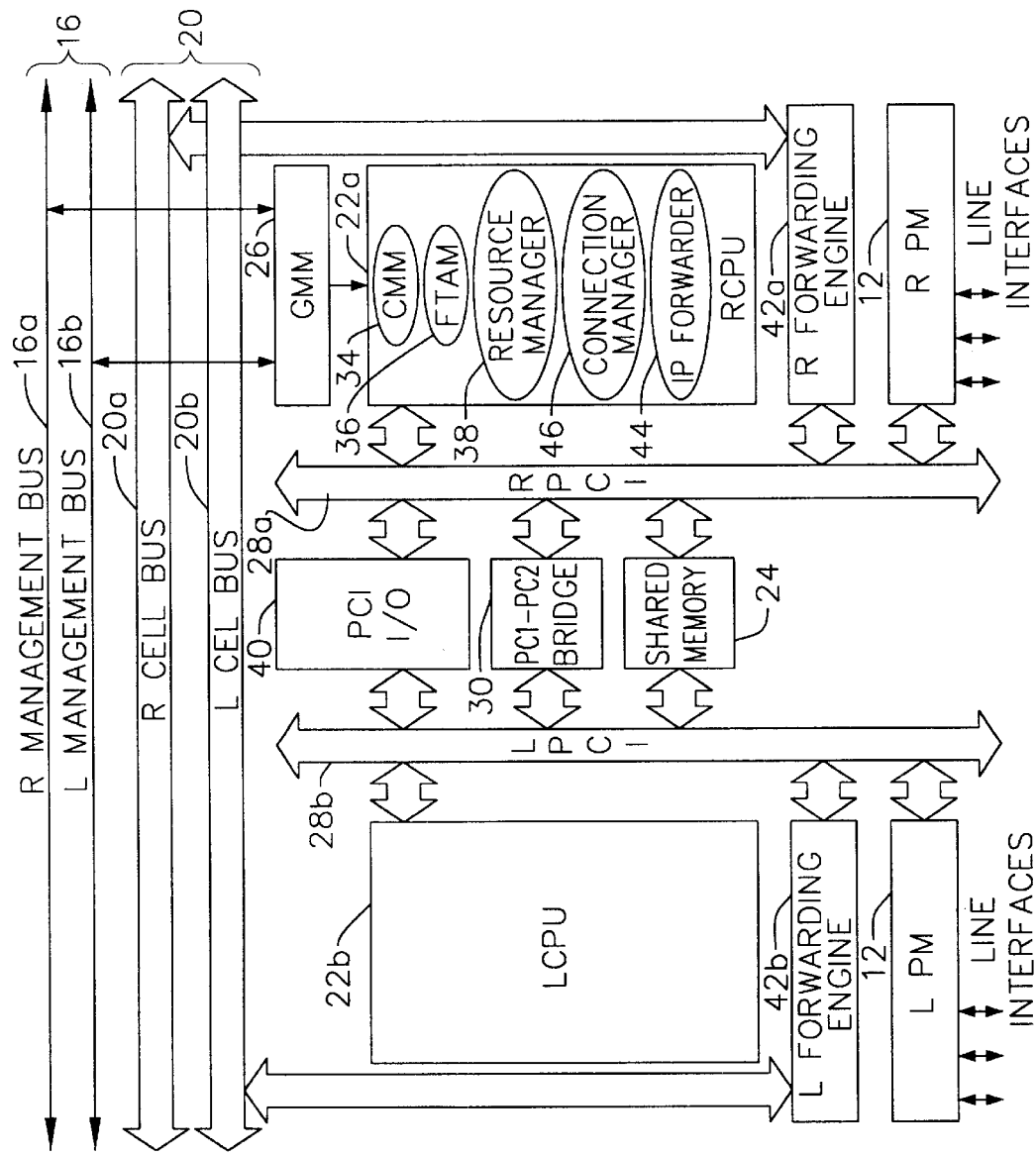
FIG. 2 is a more detailed schematic block diagram of a forwarding module of FIG. 1.

FIG. 2 is a more detailed schematic block diagram of the FM 10 of FIG. 1. Although FIG. 2 is described in terms of the FM 10, the same block diagram may also apply to the SCM 14 since the SCM 14 is a specific type of FM 10. The SCM 14, however, may include additional memory, flash PROMs, and boot PROMs.

According to one embodiment of the invention, the FM 10 includes at least one, but generally two, RISC processors: a right or first processor (RCPU) 22a (also referred to as the application CPU), and a left or second processor (LCPU) 22b (also referred to as the driver CPU). In a preferred embodiment having two CPUs, the LCPU 22b is mainly responsible for receiving and transmitting packets, and the RCPU 22a is mainly responsible for fault management, protocol encapsulation/decapsulation, and the like. Both the RCPU 22a and LCPU 22b have access to a shared memory 24 through Peripheral Component Interconnect (PCI) busses 28a, 28b.

A PCI bridge 30 connects the right PCI (RPCI) bus 28a to the left PCI (LPCI) bus 28b. The RPCI bus 28a is preferably the primary PCI bus with respect to the bridge 30, and the LPCI bus 28b is the secondary PCI bus.

Each FM 10 preferably also includes a generic module management (GMM) 26 block for exchanging messages with the RCPU 22a across the management bus 16. According to one embodiment of the invention, the GMM 26 is implemented as an intelligent microprocessor. Communication between the GMM 26 and the RCPU 22a is effectuated through a set of registers. The registers are implemented in a programmable logic device and accessed by the RCPU 22a through a PCI input/output 40 block. According to one embodiment of the invention, the GMM 26 provides two status registers, GST0 and GST1, by which the RCPU 22a polls and obtains information regarding the chassis status, status of last command issued, status of previous and current messages in the message queues, and the like.

The GMM 26 receives broadcast messages from other GMMs as well as messages addressed to its FM 10 via the management bus 16. According to one embodiment of the invention, only the GMM 26 on a card that is designated as a chassis manager receives broadcast messages. All other GMMs preferably ignore the broadcast messages and receive only those messages addressed to the card. Special processing is done by the GMM 26 resident on the chassis manager for chassis status messages periodically broadcast by the clock cards 18a, 18b, as is described in further detail below.

Any card, be it an FM 10 or SCM 14, may be designated as the chassis manager. However, there is only one active chassis manager, a primary chassis manager, for the entire system. If the primary chassis manager goes down, a backup secondary chassis manager takes over as the active chassis manager.

Selection of the primary chassis manager and the secondary chassis manager preferably occurs during power-up of the system. Each card includes a chassis management switch, and all cards with the chassis management switch turned on are chassis manager candidates. These candidates power-up without any need of sending activation requests. According to one embodiment of the invention, the card in the lowest slot of the chassis with the chassis management switch turned on is selected as the primary chassis manager, and the card in the second lowest slot of the chassis with the chassis management switch turned on is selected as the secondary chassis manager. If only one card exists in the system, it becomes both the primary chassis manager and the secondary chassis manager. Once the primary and secondary chassis managers are elected, these cards begin responding to activation requests received from the other cards.

The primary and secondary chassis managers communicate via hello messages over the cell bus 20. The primary chassis manager controls the right active management and cell busses 16a, 20a. The secondary chassis manager controls the left standby management and cell busses 16b, 20b. If the secondary chassis manager detects a failure of the primary chassis manager (due to timeout of the hello messages), the secondary preferably switches over to the right management bus 16a, resets the primary chassis manager, and becomes the new primary chassis manager. The new primary chassis manager selects a new secondary chassis manager based upon slot location in the chassis. If the primary chassis manager detects a failure of the secondary chassis manager, the primary chassis manager resets the secondary chassis manager and selects a new FM 10 to act as the secondary chassis manager.

The chassis manager includes a chassis management module (CMM) 34. The CMM 34 receives and transmits chassis status messages via the GMM 26, and is responsible for monitoring and managing the system. Among other things, the CMM 34 is responsible for chassis power management. Thus, when a new FM 10 is inserted into the system, the GMM 26 of the newly inserted card reads a serial EEPROM in the FM 10 and PMs 12 for determining their power requirements. The EEPROM stores information about the model, revision, serial number, and power requirements of the card. The new card's GMM 26 then broadcasts the power requirement in an activation request message on the management bus 16 to the chassis manager. The GMM 26 in the chassis manager receives the request and passes it on to the CMM 34 for determining if there is sufficient power in the system to bring up the card. If there is, the GMM 26 in the chassis manager answers with an activate module message.

The CMM 34 in the chassis manager is preferably also responsible for clock card monitoring. The CMM 34 in the primary chassis manager listens for the chassis status messages periodically sent by the right clock card via the right management bus 16a, and the CMM 34 in the secondary chassis manager listens for the chassis status messages periodically sent by the left clock card via the left management bus 16b. The chassis status messages include the status of chassis power supplies, fans, and temperature. The GMM 26 in each chassis manager monitors its respective management bus for the chassis status messages. The GMM 26 then notifies the CMM 34 of any change in the chassis status message. If power is a limiting resource, the CMM 34 powers down cards starting from the highest numbered slots until power consumption requirements can be met by the power supplies still operational in the system.

If the GMM 26 does not receive two successive chassis status messages on a particular management bus, the GMM informs its CMM 34. The CMM 34 then invokes the fault tolerant application manager (FTAM) 36 to broadcast out a test message on its management bus. If the transmission succeeds, or if the transmission fails due to unavailability of the destination, its clock card (e.g. the right clock card 18a) is assumed to have incurred a fault and the FTAM 36 generates a fault notification. All cards are then moved to the standby management bus (e.g. the left management bus 16b). When the faulty clock card is back in service, all cards are preferably moved back to original management bus (e.g. the right management bus 16a).

If the transmission fails due to bus unavailability, then the management bus being monitored (e.g. the right management bus 16a) is deemed to have incurred a fault, and the FTAM 36 generates a fault notification. The corresponding chassis manager moves all cards to the standby management bus (e.g. the left management bus 16b). The faulty management bus is monitored, and when back in service, all cards are, preferably moved back to this bus.

Management and monitoring of the chassis by the CMM 34 is done in conjunction with the FTAM 36 running in the chassis manager. An instance of the FTAM 36 also runs in each of the other cards in the chassis. Whereas the CMM 34 is responsible for the entire chassis, the ETAM 36 is preferably responsible for recognizing faults and acting on some of the faults that are local to the card. Among other things, FTAMs 36 provide local monitoring, fault detection, fault notification, fault isolation, and service restoration (wherever possible) for card failures and link/port failures.

Application software components register with the FTAM 36 identifying events to be monitored. When a fault is detected, the FTAM 36 notifies all applications that have registered for that type of event. The FTAM 36 and the applications then take corrective action. For instance, a clock manager application may register with the FTAM 36 for selection of external clock sources on active links. A redundant port list application may register with the FTAM 36 for determining faulty links and switching over to active backup ports. IP applications may register with the FTAM 36 for updating forwarding tables with failed link/port entries.

Each FTAM 36 detects a card failure via hello messages. Each FM 20 sends out a hello message at fixed time intervals over the cell bus 20. If a card does not send hello messages, the other cards in the system mark this card as being down. The FTAM 36 in each card then updates all tables impacted by the failure event. The primary SCM 14, upon detecting the card failure, issues a reset request over the management bus to the primary chassis to restart the defective card.

Each FTAM 36 also preferably detects link/port failures. Link and port drivers constantly monitor the state of each link and port. If a change in state is detected, a link failure broadcast message is sent to the FTAM 36. The system's automatic protection switching (APS) hardware and software mechanisms allow automatic recovery from both equipment faults and external link failures. For example, each port on the primary rate interface (PRI) PM 12b (FIG. 1) has two connectors, a Port "A" 13 connector and a Port "B" 15 connector. If an internal fault is detected on Port "A" 13, the system's APS mechanism automatically redirects WAN traffic through the Port "B" 15 connector.

Referring again to FIG. 2, each FM 10 further includes a connection manager 46 and a resource manager 38. The connection manager 46 detects incoming calls to the FM 10 and the resource manager 38 manages and allocates local resources including digital modem and ISDN switched resources. Each connection to the switch needs a specific set of hardware and software resources. A frame relay call, for example, needs a line interface, an HDLC controller, a frame relay protocol stack, and frame forwarding software. Generally, all the resources required for a connection are found on the input FM 10 and its associated PMs 12. Sometimes, however, traffic entering the system on one card requires resources on another. Thus, when the connection manager 46 detects an incoming call, a resource request is broadcast over the cell bus 20. The resource manager 38 in each card receives the request and determines what resources are needed. If the card has the requested resource, it is allocated to the incoming call.

Each FM 10 also includes an IP forwarder 44 for forwarding packets based on layer three addresses. The IP forwarder module preferably contains local routing information for forwarding a packet via a right, or first, IP forwarding engine 42a and a left, or second, IP forwarding engine 42b. When a packet is received by the FM 10, the IP forwarder 44 proceeds to forward the packet if it has learned the destination address. Otherwise, the IP forwarder 44 performs a lookup of a central routing table and obtains the necessary routing information.

Figure 3:
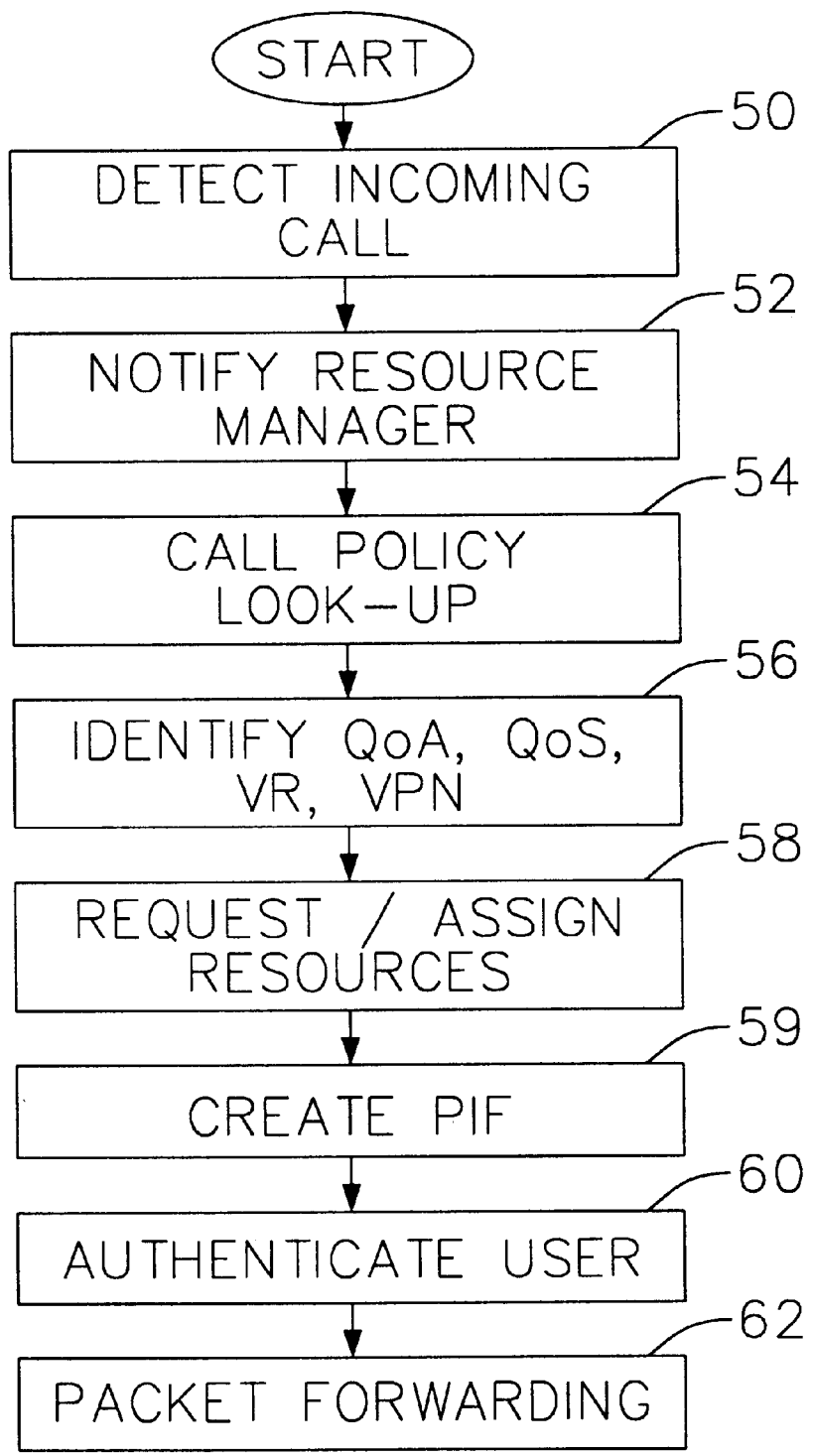
FIG. 3 is an exemplary flow diagram for processing a call coming into the switch of FIG. 1.

FIG. 3 is an exemplary flow diagram for processing a connection request coming into the switch of FIG. 1. The program starts, and in step 50, the connection manager 46 detects an incoming call in one of the physical ports of the FM 10 (the receiving FM). In step 52, the connection manager 46 notifies the resource manager 38 in the receiving FM 10 of the incoming call. The resource manager 38, in step 54, searches a call policy database for a call policy record corresponding to the incoming call. The call policy record includes various parameters which dictate how the call is to be routed. Different policies may be applied based on the inlink of the call, a telephone number, a domain name, a source address, a destination address, and the like.

Included in the call policy parameters are a quality of access (QoA) level, quality of service (QoS) level, virtual router ID, and virtual private network ID associated with the call. QoA is a method of classifying users and granting access to the switch based on a comparison of their QoA level to the current resource utilization. This allows for tiered access to the Internet when there s a competition for resources. Each QoA level is preferably assigned a percentage of threshold resource usage. If resource utilization is below the percentage of threshold resource usage assigned to the incoming call's QoA level, the call is accepted. Otherwise, the call is rejected.

QoS is a method of classifying users to determine the priority with which packets are conveyed once a call has been accepted. QoS offers preferential treatment by processing connections based on their QoS levels. The higher the QoS level attached to the call, the higher the processing priority given to the packets associated with the call.

The incoming call's virtual router ID and virtual private network ID allow the switch to provide access to resources that the user authorized for. According to one embodiment of the invention, the switch may be partitioned into multiple virtual routers where each virtual router has its own set of resources (e.g. ISDN or modem resources) and routing tables. Thus, each virtual router preferably functions as a separate router in an independent and self-contained manner. Each virtual router may further be partitioned into multiple virtual private networks (VPNs) for further controlling access to the switch. VPNs are created with filtering software that filters traffic directed to the virtual router based on criteria such as, for example, source address and/or destination address.

Once a call's QoA level, QoS level, virtual router ID, and VPN ID have been identified from the call policy record, the resource manager 38, in step 58, broadcasts a resource request message to the other FMs 10. If any of the FMs 10 have an available resource that matches the call's QoA level and virtual router ID, the FM 10 with the available resource transmits a response to the receiving FM 10 for connecting the call to the available resource.

If the incoming call is accepted, the program, in step 59, creates a port interface (PIF) object that determines the layer two protocol to be utilized for the session. A generic forwarding interface provided by the switch then dynamically bonds the layer two interface to the layer one interface of the physical port. In this way, layer two protocols need not be made dependent on the physical media ports in which they run on, but may be determined dynamically at runtime.

In step 60, the program invokes the ISP's authentication server for authenticating the user. A typical authentication server is a Remote Authentication Dial In User Service (RADIUS) server. The authentication server preferably includes a database of users and user configuration information detailing the type of service to deliver to each user. Service configuration information may include the type of compression, QoA level, QoS level, and/or a VPN ID assigned to the user, as is described in further detail below. According to one embodiment of the invention, the configuration information in the authentication server may override default configuration information provided through the call policy database.

After the user has been authenticated, data packets may be forwarded to their destination addresses as indicated by step 62. In this regard, the switch provides for a uniform interface, called a generic forwarding interface (GFI), responsible for all internal packet forwarding, either between ports on the same FM 10 or across the bus to another FM 10 in the switch. Specifically, the GFI software provides for transparency between applications and link protocol, and the physical link driver, so that any physical interface may be associated with any protocol or application. Thus, all GFI forwarding functions are preferably protocol transparent.

When a packet arrives into the system, the GFI software translates the packet into a generic format using GFI utilities. When the packet is to be transmitted to a physical port, the GFI software invokes the appropriate driver's forwarding function to transmit the packet. The driver's forwarding function is then responsible for identifying the physical port and passing the packet to the PIF module for translating the generic packet into the driver's specific format and transmitting it out the required port.

Before forwarding the data packet, however, a check is preferably done to determine whether there are filters to be applied to the data packet. The filters determine whether the packet is to be forwarded or dropped. The filters applicable to the data packet are located based on the packet's VPN ID.

II. Distributed Processing and Packet Forwarding

One of the features of the multi-service network switch of FIG. 1 is IP (layer three) routing using a distributed processing and packet forwarding architecture. The IP forwarder module 44 in each FM 10 provides the necessary packet forwarding and route processing intelligence. Unlike a traditional access server where a centralized processor creates a bottleneck, a distributed forwarding architecture helps to reduce or eliminate the single point of congestion and allows the products to scale for both the number of connected interfaces and for packet forwarding performance.

Figure 4:
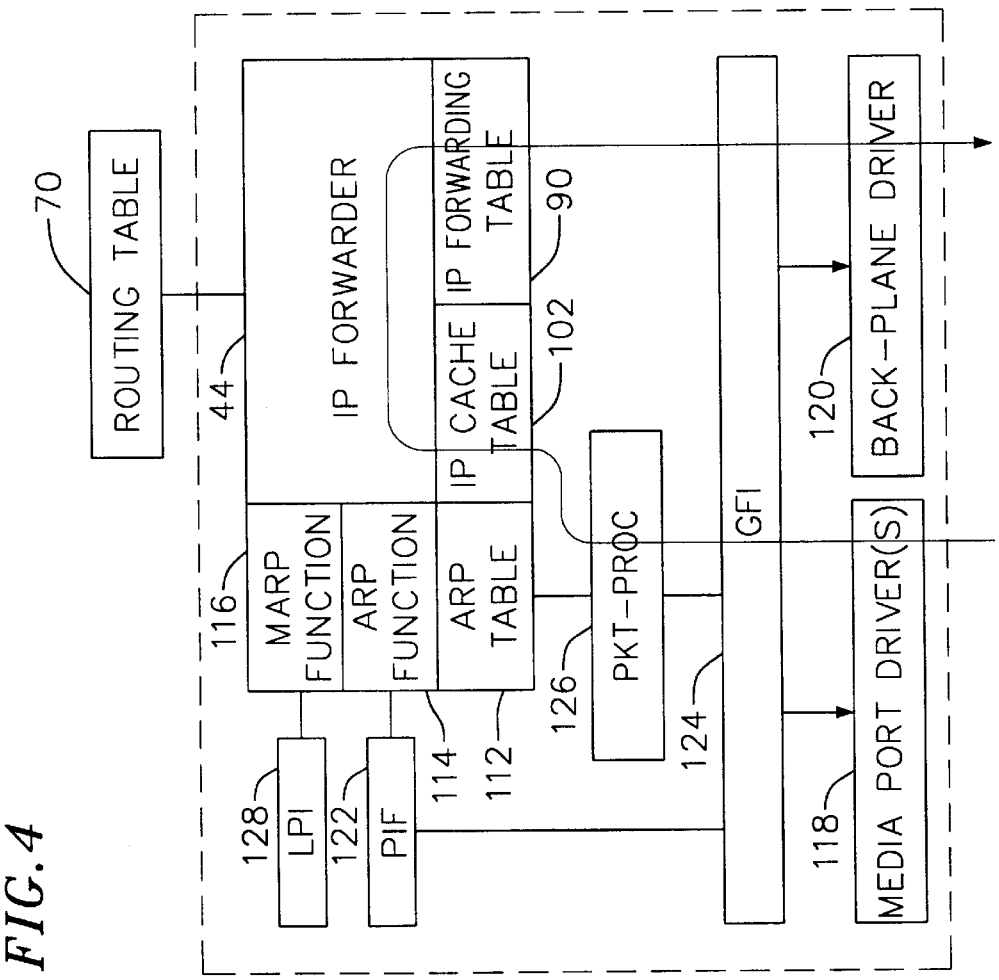
FIG. 4 is a more detailed functional block diagram of an IP forwarder module of FIG. 2.

FIG. 4 is a more detailed functional block diagram of the IP forwarder module 44 of FIG. 2. An IP data packet arrives at a media port of a PM 12 and is processed by its media port driver 118. The IP data packet may also be received by a backplane driver 120 if, for example, the packet has been forwarded by another FM 10 via the cell bus 20.

When a connection is made on the media port, the switch creates a port interface (PIF) 122 object for the port. The PIF 122 object determines the layer two protocol to be utilized for the current session based on the type of connection, and the GFI software 124 dynamically bonds the layer two interface to the layer one interface of the media port. In this way, layer two protocols need not be made dependent on the physical media ports in which they run on, but may be determined dynamically at runtime.

The PIF 122 also includes PIF structures for storing specific media and packet format information for each port. PIF structures are maintained as two dimensional arrays using a controller number and a port number as the index.

A logical port identifier (LPI) 128 communicates with the PIF 122 and includes the IP parameters related to each physical port. The IP layer calls an LPI transmit function whenever it wants to transmit a packet. The LPI transmit function identifies the appropriate physical port and passes the packet to the PIF 122 for adding the media specific layer two encapsulation headers and transmitting it out from the appropriate port.

When a packet is received by the media port driver 120, the packet is preferably translated by the driver to a generic format and transmitted to the GFI 124 software. GFI 124 preferably handles all internal packet forwarding in a protocol transparent layer, hiding the details of transmitting and receiving packets over different interface types. GFI 124 further queues the packet in one of four GFI buffers resident in the system shared memory 24 (FIG. 2) based on the packet's QoS.

A packet processing module 126 polls the GF2 buffers for the packet, and parses the packet for locating the packet's PIF structure. Once located, the packet processing module 126 preferably checks that the packet is a data packet, checks that a session is established, and hands the packet over to the IP forwarder 44. If the packet needs to be routed, the IP forwarder tries to obtain the destination information from its IP cache 102 or forwarding table 90. If unsuccessful, the IP forwarder 44 attempts to obtain the information from a routing table 70 stored in the SCM 14. In addition, the IP forwarder 44 might obtain additional parameters for the destination address from an address resolution protocol (ARP) table 112 through an ARP function block 114, or through a management ARP (MARP) request via a MARP function block 116.

FIG. 5 is a schematic layout diagram of a routing table 70 according to one embodiment of the invention. The routing table 70 includes a list of all of the IP destination addresses reachable from the FMs 10, and all known routes to each destination address. The routing table may be created based on standard routing protocols including Routing Information Protocol (RIP), Open Shortest Path First (OSPF), Border Gateway Protocol 4 (BGP4), and the like.

According to one embodiment of the invention, the routing table 70 includes a destination field 72 identifying a configured destination IP address to where a packet might be forwarded. The routing table also includes a subnet field 74 indicating the significant bits of the destination IP address by either hiding or showing part of the address. The number "0" allows the corresponding bits of the IP address to be shown when the number "255" hides the corresponding bits of the IP address. In this way, a range of addresses in the subnet may be specified.

The routing table 70 further includes a next hop router field 76 indicating an IP address to a next hop router. An owner field 78 indicates how the route was learned. Specifically, "OSPFE" indicates that the route is an external route learned from a different routing domain (e.g. RIP). "OSPF1" indicates that the route is an intra-area route. "OSPF2" indicates that the route is an inter-area route. "LOCAL" indicates that the route is directly-connected. "STATIC" indicates that the route is a manually-configured route. "DIAL-POOL" indicates that the route is assigned out of a dial-up pool.

A cost field 80 indicates a cost associated with each route. The cost is based on a distance metric to the destination IP address using the indicated route. Generally, the cost is calculated using any suitable or conventional distance vector algorithm.

FIG. 6 is a schematic layout diagram of a forwarding table 90 according to one embodiment of the invention. The forwarding table 90 is a subset of the routing table 70. Unlike the routing table 70, however, the forwarding table 90 preferably includes a list of IP destination addresses and the best known route to each of these destination addresses.

As with the routing table 70, the forwarding table 90 includes a destination field 92 and a subnet field 94 respectively indicating IP destination addresses and subnet masks. A next hop router field 96 indicates an IP address to the next hop router if the route is a remote route.

A type field 98 indicates a type of port connection. For instance, if the type of connection is indicated as "SPORT," the destination IP address is on a single port. If the type of connection is indicated as "VLAN," the destination is part of a virtual LAN. If the type is indicated as "DIAL," the destination port exists in the dial-up IP address pool.

The forwarding table also includes a flag field 100 for describing the types of route. Valid values for this field are "S" indicating a system interface where the destination exists on the far side of a switch interface; "D" indicating a direct interface where the destination is connected to the switch (either on the same card or on a different card); "R" indicating that the destination is remote on another device of the network; "P" indicating that the destination is a supernet; "F" indicating that the destination is a default route; and "M" indicating that the destination is a management interface.

FIG. 7 is a schematic layout diagram of an IP cache 102 according to one embodiment of the invention. The IP cache 102 also resides in each of the FMs 10 and includes a list of the most recently used IP source/destination address pairs, along with the physical port address and header information. Thus, if a destination address exists in the IP cache, packets may be forwarded without lookup of any routing or forwarding table, allowing increased forwarding performance.

According to one embodiment of the invention, the IP cache 102 includes a destination field 104 and a source field 106 indicating recent IP destination and source addresses. An out port field 108 indicates a physical port on which data is transmitted to the destination address. A header field 110 indicates 16-bits of MAC header information for forwarding the packet to the destination address.

FIG. 8 is a schematic layout diagram of an ARP table 112 according to one embodiment of the invention. The ARP table allows the resolution of IP addresses to MAC addresses and physical port addresses for local destinations. When a device is connected to the FM 10, the IP software dynamically resolves the MAC-to-IP address translation and stores this information in the FM's 10 ARP table 112.

The ARP table 112 includes an IP address field 200 indicating an IP address to be translated to a MAC address and to a physical port address. A MAC address field 202 indicates the MAC address corresponding to the IP address. A physical port field 204 indicates the physical port address corresponding to the IP and MAC addresses. According to one embodiment of the invention, the port address convention is as follows:

device type.chassis.slot.PersonalityModuleLocation.link.port

The device type is a two-character description of the type of PM 12 providing the connection. The switch preferably supports at least the following PMs: primary rate interface PMs 12*b* for ISDN (is); primary rate interface PMs 12*b* for T1 (tl); digital modem server PMs 12*c* (mo); Ethernet switch PMs 12*a* (en); and serial data interface PMs 12*d* for frame relay (fr).

The chassis number is a number assigned to the switch. The slot number is where the FM is inserted. Slots are numbered sequentially from bottom to top starting from slot number one. The personality module location indicates either a right PM (number 1) or a left PM (number 2). The link specifies the number of logical links configured on the module. The port number indicates a port on the PM. Thus, according to this connection, physical port address En 1.3.1.1.1 indicates a connection to an Ethernet module, in chassis 1, on slot 3, on the right PM, on link 1, and physical port 1.

The ARP table 112 also includes a type field 206 indicating that the address is static ("S") if the address was statistically configured in a network, local ("L") if the address is on a directly-connected network, dynamic ("D") if the address was learned, remote ("R") if the address was on a remote network, point-to-point ("P") if the address was learned on a point-to-point link, a router ("T") if the address belongs to a router, or broadcast ("B") if the address was learned through a broadcast packet.

Figure 9:
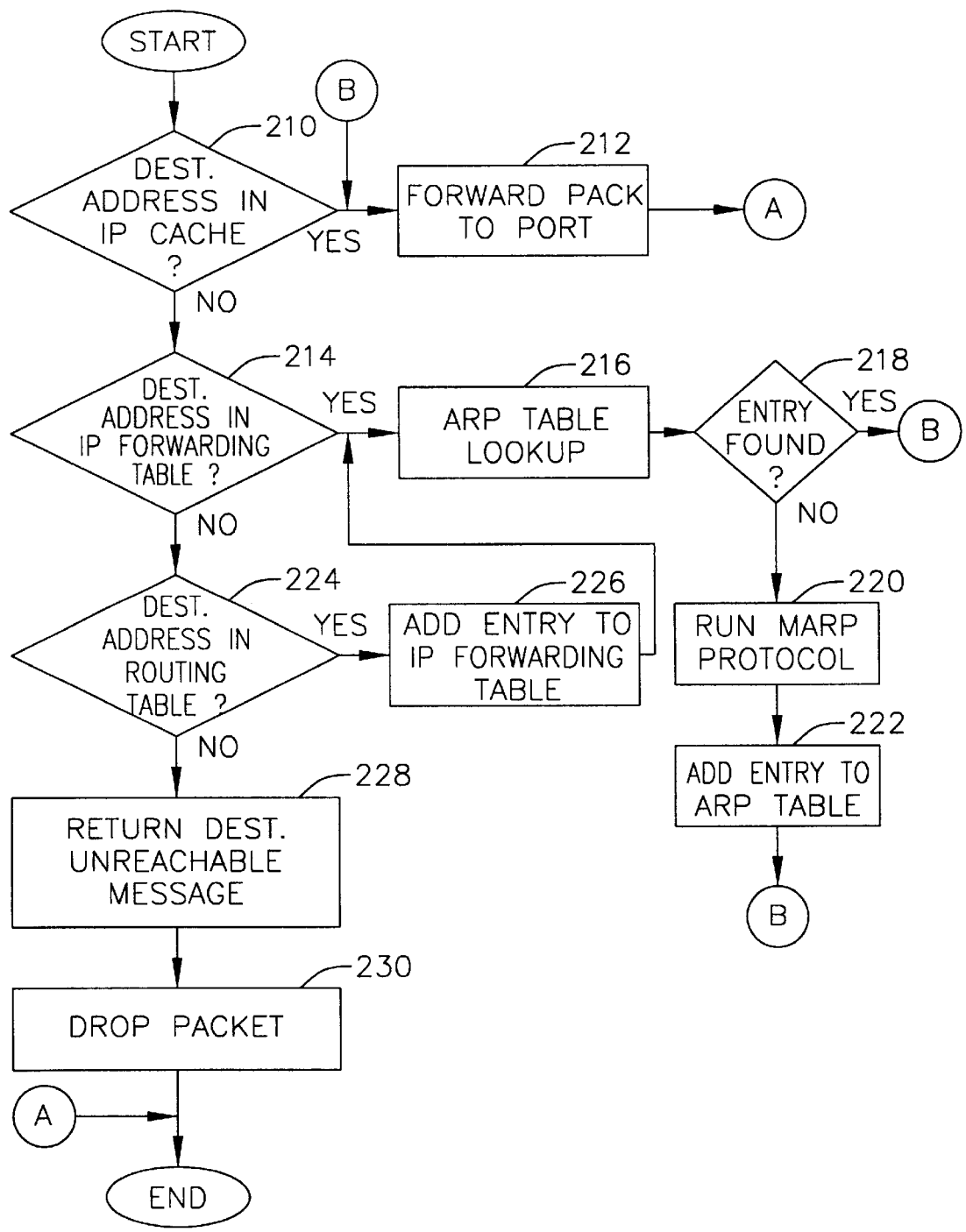
FIG. 9 is a flow diagram of a packet forwarding process engaged by the IP forwarder module of FIG. 4.

FIG. 9 is a flow diagram of a packet forwarding process engaged by the IP forwarder 44. When an IP packet that needs to be routed is handed to the IP forwarder 44, the program inquires in step 210 whether the IP cache 102 includes the destination address. If an entry for the destination address exists in the IP cache 102, the MAC header is copied from the header field 110 onto the packet, and the packet is forwarded, in step 212, to the physical port indicated by the out port field 108. The backplane driver 120 is utilized to forward the packet if the physical port resides on a different card.

If there is no entry for the destination address in the IP cache 102, the program inquires in step 214 whether the destination address is in the IP forwarding table 90. If the answer is YES, the program retrieves the route to the destination and determines whether the route is via one of the ports on the same card or through another card. If the route is via one of the ports on the same card, it may be handled locally. Accordingly, the program, in step 216, searches the ARP table 112 for the destination address if it is directly attached, or for the next hop router obtained from the next hop router field 96 of the forwarding table 90 if it is a remote route. If either the destination address or the next hop router is found in the ARP table 112, as inquired in step 218, the packet is sent to the indicated physical port address, and the entry is added to the IP cache 102.

If there is no entry in the ARP table for the destination address or the next hop router, then the destination is not via one of the ports on the same card. Thus, the program, in step 220, invokes a management ARP (MARP) protocol to discover whether the destination is through a port on a different card. The program thus places a MARP request packet in front of the IP packet and broadcasts it out on the management bus 16 to find if another FM 10 has the path to the destination. The FM 10 with the destination IP route strips off the MARP packet and forwards the IP packet out the appropriate interface. A MARP response packet is then sent back to the originating FM 10 so that its ARP table 112 may be updated with the port information as is indicated in step 222. All subsequent packets may now be forwarded directly to the port and not broadcast onto the bus.

Referring back to step 214, if the destination address is not in the forwarding table 90, a request for the route is sent to the SCM 14. In step 224, the program inquires whether the destination address exists in the routing table 70. If the answer is YES, the route to the destination address is retrieved and stored in the forwarding table in step 226. If multiple routes exist to the same destination, the SCM 14 preferably returns the route with the lowest cost. If multiple routes exist to the same destination and both routes have the same cost, the SCM 14 returns whichever route appears first in the routing table 70. The program then performs either an ARP table lookup or invokes the MARP request to forward the packet to the destination address.

If the destination address is not in the routing table, the SCM 14, in step 228, returns a message indicating that the destination was unreachable, and the packet is dropped in step 230.

III. Policy Based Routing

Another feature of the multi-service network switch of FIG. 1 is the ability to select a router based on certain characteristics of a connection request. Such characteristics include, but are not limited to, an inbound access channel or link, a calling or called telephone number, a domain name, a source address, a destination address, and the like. Among other things, this feature facilitates the wholesaling of dial-up connections to other ISPs. For example, all user traffic received by a particular type of inlink (e.g. an ISDN line) may be directed to the router operated by a wholesaling ISP designated to the inlink. Thus, policy based routing allows a routing path to be selected within the switch without having to refer to a separate routing table.

For domain-based routing, a user's login information (e.g. "user@isp1.com") may be used to select an ISP and authenticate the user with the ISP's authentication server. Once authenticated, all packets originated by the user are forwarded to the router designated for the domain operated by the ISP.

Figure 10:
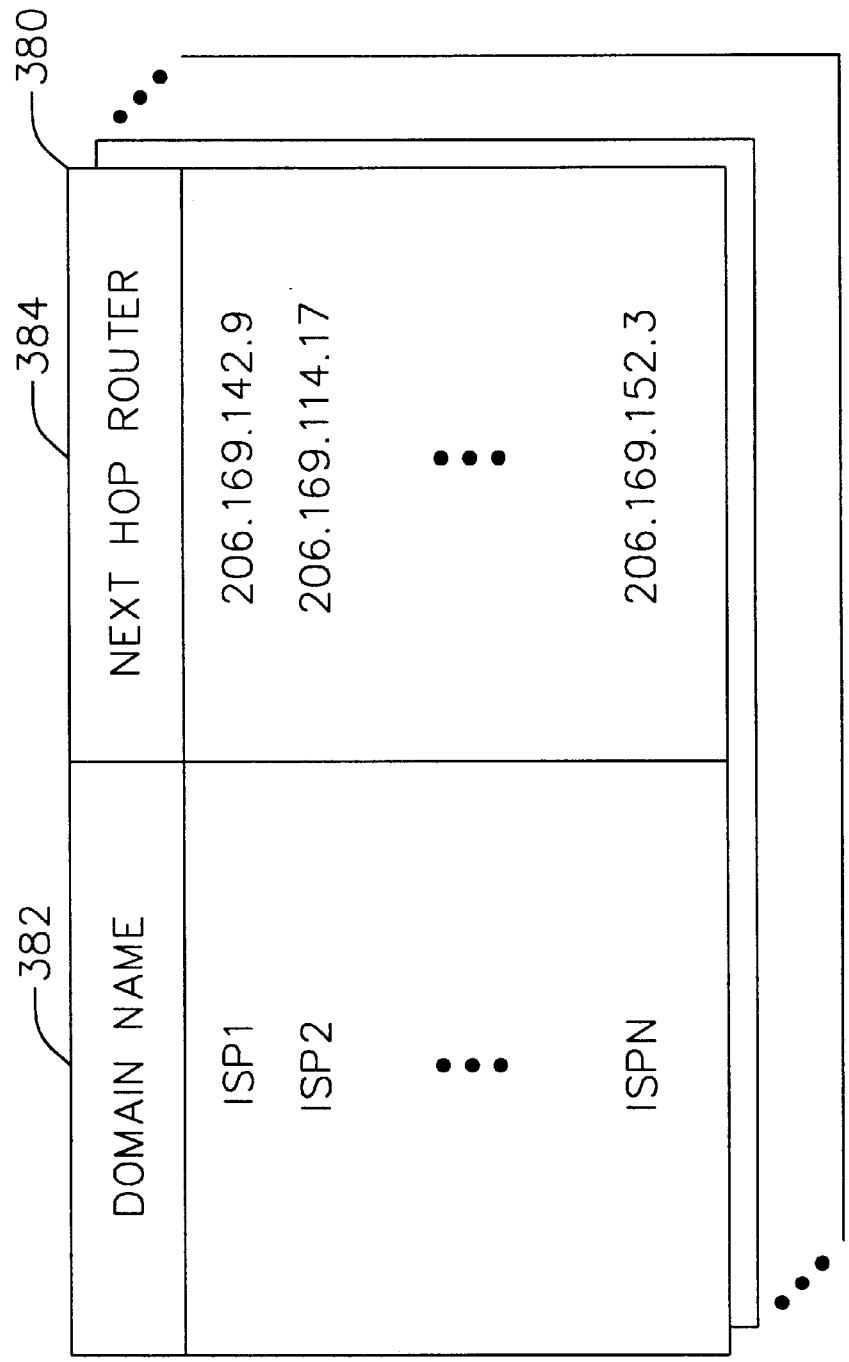
FIG. 10 is a schematic layout diagram of a domain database.

According to one embodiment of the invention, the switch maintains a domain database including parameters that determine the domain to which the user is to be connected. FIG. 10 is a schematic layout diagram of a domain database 380 according to one embodiment of the invention. Each domain database 380 is headed and identified by a domain name 382 that a user may specify to be connected. The domain database 380 also includes a next hop router's address 384 identifying a router designated for the domain. Packets originated by the user connected to the domain are then forwarded to the specified router.

For source-based routing, packets are forwarded to a specific router based on the source address of the packet. Thus, the user with a specified source address preferably only accesses the domain which is behind the designated router. According to one embodiment of the invention, router information for source-based routing is set-up for each user in the ISP's authentication server.

For call-policy-based routing, packets are forwarded to a specific router based on a telephone number, link, or channel of a dial-up connection. According to one embodiment of the invention, the switch maintains a call policy database including call profile information, referred to as call policy parameters, that determine how a dial-up connection is to be handled. Specifically, the call policy parameters allow the selection of specific routers to which all user traffic should be directed. The call policy database may be configured in a number of ways, but is preferably configured as a plurality of call policy records, each record defining a unique profile for a set of users requiring system access.

Figure 11:
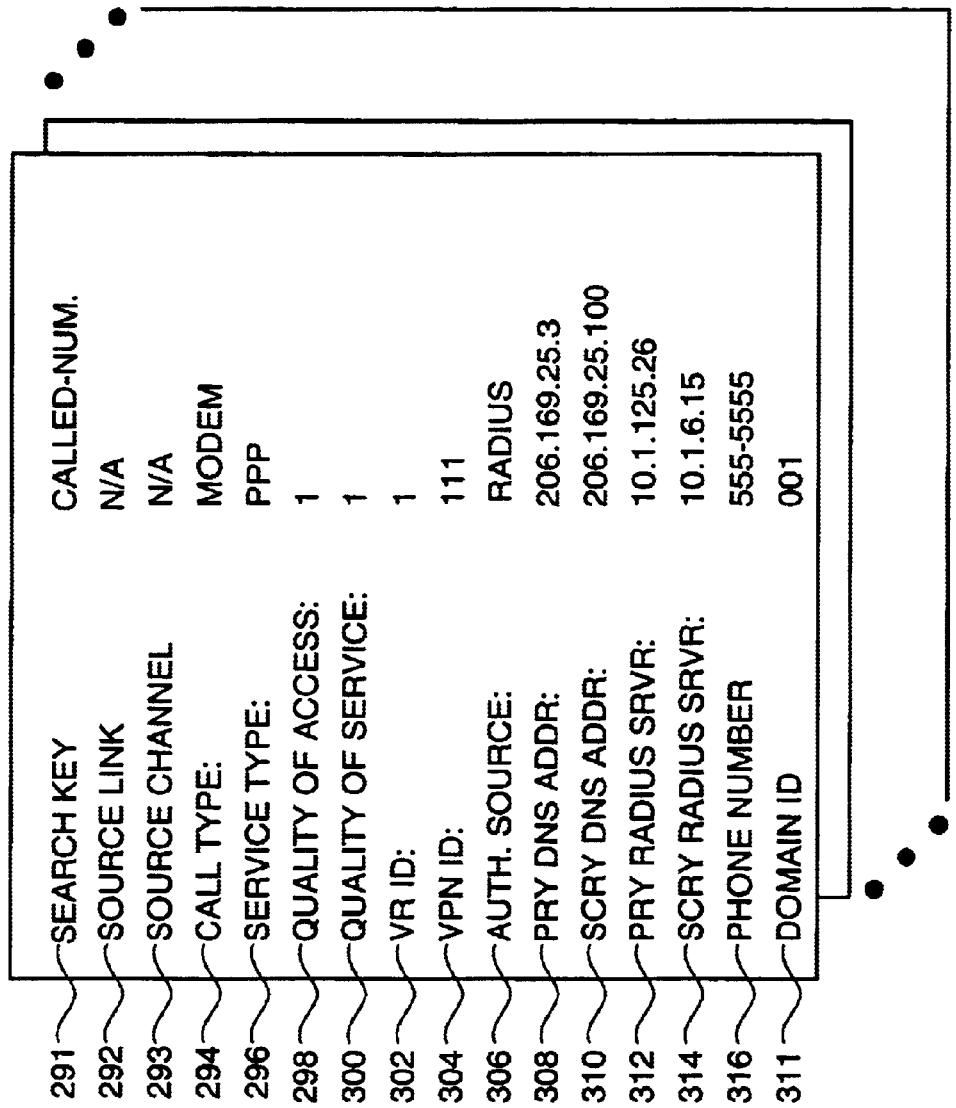
FIG. 11 is a schematic layout diagram of a call policy record.

FIG. 11 is a schematic layout diagram of a call policy record 290 according to one embodiment of the present invention. The call policy record 290 includes a search key 291 for keying-in to the record. The search key 291 may be designed to be one of various features or combination of features associated with an incoming call. Preferably, the search key 291 is a telephone number, an inlink or a channel within an inlink (e.g. DS0) on which the call is presented, or a combination of both. For example, if the search key indicates "called," the call policy is applied to the called phone number. If the search key indicates "calling," the call policy is applied to the calling phone number. If the search key is "inlink," the call policy is applied to any calls received on a specified inlink. The specific inlink and/or channels is specified in a source link field 292 and/or source channel field 293. The called or calling phone numbers are specified in a phone number field 316.

Each call policy record 290 includes a call type 294 identifying a type of call received, and a service type 296 identifying a type of service being requested by the call. According to one embodiment of the invention, the call type 294 includes ISDN and modem calls, and the service type 296 includes point-to-point protocol (PPP) or terminal services.

Each call policy record 290 further includes a QoA level 298 identifying the type of priority to be given to the call, and a QoS level 300 identifying the type priority to be given to the packets to be conveyed once the call is accepted.

The call policy record 290 also includes a virtual router ID 302 and a virtual private network ID 304. The virtual router ID 302 identifies a virtual router to which the call is to be directed. As explained in further detail below, each virtual router is allocated a set of resources and routing protocols that allow the virtual router to act as an independent router within the switch. The virtual private network ID 304 identifies a virtual private network that controls access to the virtual router.

In addition to the above, the call policy record 290 further specifies an authentication source 306 as being either the ISP's authentication server or a local database provided by the switch. If the authentication source is the ISP's authentication server, the call policy record specifies a primary authentication server 312 and a secondary authentication server 314 that activates if the primary goes down.

The call policy record 290 also includes an IP address of a domain name server (DNS) to handle the call. The switch preferably supports a primary DNS address 308 and a secondary DNS address 310 that activates if the primary goes down.

In order to select the appropriate router for the dial-up connection, the call policy record 290 includes a domain ID 311 with an index to a domain database record. The domain database record includes the address of the router that is to handle the traffic originated from the user.

Figure 12:
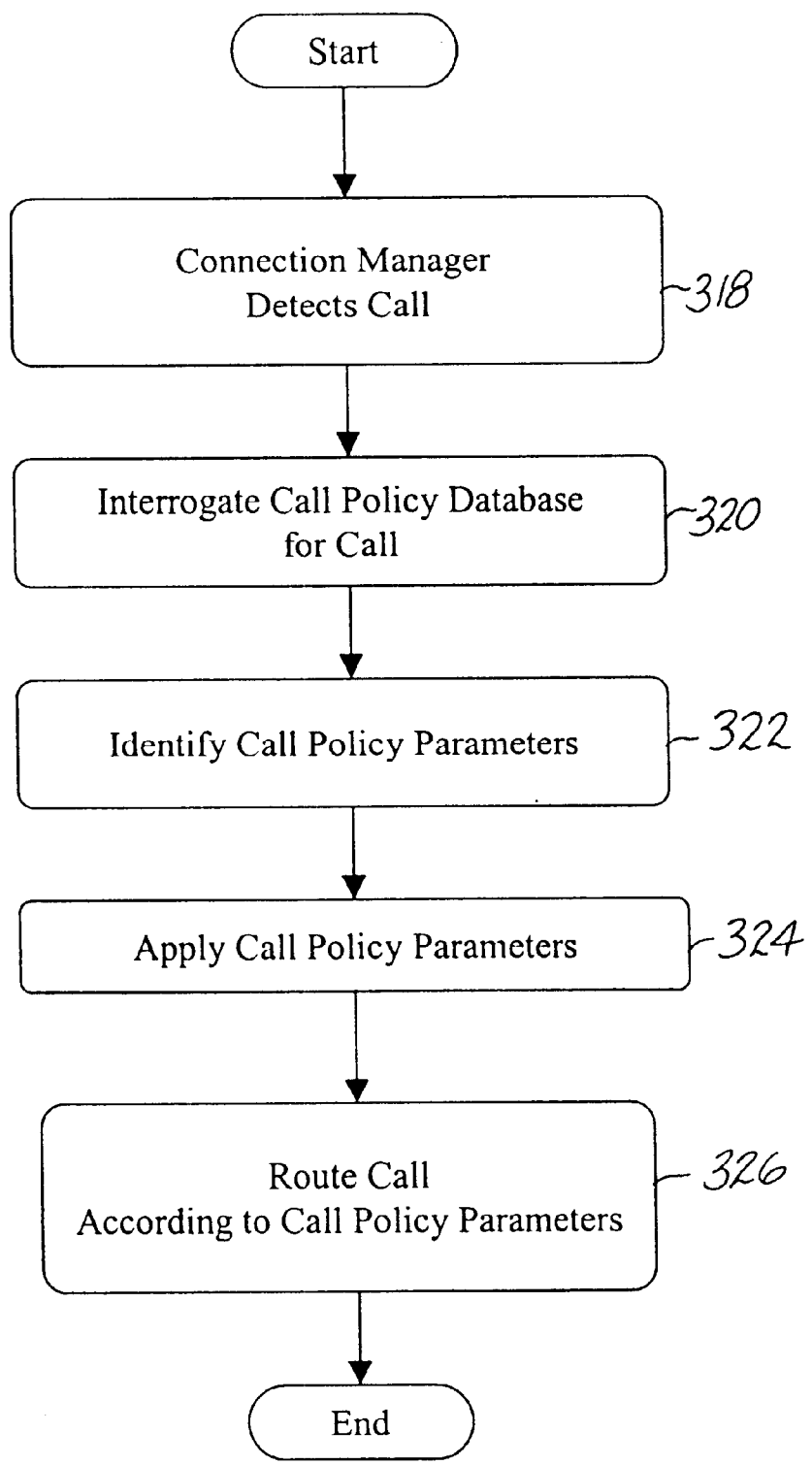
FIG. 12 is a process flow diagram for policy based routing.

FIG. 12 is a process flow diagram for policy based routing according to one embodiment of the invention. The program starts, and in step 318, the connection manager 46 detects an incoming call and notifies the resource manager 38 that there is a call. In step 320, the resource manager 38 interrogates the call policy database and retrieves the appropriate call policy record 290 using one or more of the search keys 291. In step 322, the call parameters listed in the call policy record 290 are identified and applied in step 324. Other policies such as domain-based routing may also be applied if appropriate. In step 326, the program routes the call to the appropriate router based on the policy parameters.

IV. Quality of Access in Access Servers

Another feature of the multi-service network switch of FIG. 1 is the ability to allow tiered access to system resources including dial-in modem and ISDN resources by assigning QoA service levels to incoming connection requests. In this way, an ISP utilizing the switch may offer different access service levels with different pricing for each service level. The higher the QoA service level, the higher the access priority, and consequently, the higher the probability of getting a connection when resource availability in the switch is low.

According to one embodiment of the invention, the QoA level for an incoming connection is defined in the call policy record 290. The call policy record designates QoA access levels based on a particular feature of the incoming call, such as the type of inlink, phone number, and the like. When a connection is requested, the call's call policy record is retrieved and the call's QoA level identified. A requested resource is then allocated to the call based on the identified QoA level and current resource usage.

If the ISP's authentication server is used for authenticating the user, a QoA level for the user is further defined as part of the user configuration information. The QoA level in the authentication server may be configured to override the QoA level in the call policy record.

FIG. 13 is a schematic layout diagram of a QoA table 332 according to one embodiment of the invention. The QoA table 332 includes a default number of QoA levels 328 and access thresholds 330 associated with each QoA level. According to one embodiment of the invention, the default number of QoA levels 328 is four.

The access threshold 330 associated with each QoA level 328 preferably indicates a maximum number of resources that may be in use before a resource is allocated to the connection request. If the resource utilization exceeds the access threshold 330 corresponding to the user's QoA level 328, the request is refused. In the example of FIG. 13, a user with the lowest QoA level (level one) always has access to available system resources. A user with a QoA level of two has access to available system resources until 75 percent of those resources are in use. At that point, no new users in the same QoA level are permitted access to system resources until more resources become available. For a user with a QoA level of four, system resources become limiting once the access threshold reaches 25 percent.

According to one embodiment of the invention, the system reserves the system resources for other connections by disconnecting users with low QoA levels. In this regard, the resource manager 38 periodically checks the utilization of system resources (e.g. every 60 seconds.) The resource manager 38 compares the system resources in use to the access threshold 330 associated with each logged-in user's QoA level. If the system resources in use exceed a user's access threshold 330, the user is disconnected. If multiple users with different QoA levels are connected to the Internet, the resource manager 38 preferably disconnects users in descending order. For example, level four QoA users are disconnected first, then level three QoA users, and so on, until enough resources have been reclaimed to serve future connection requests.

For example, assume that three users are connected to the Internet. User 1 has QoA level of one, User 2 has a QoA level of two, and User 3 has a QoA level of three. If system resource usage is 50 percent or less, all three users remain connected to the switch. If system resource usage reaches 70 percent, only User 1 and User 2 remain connected. User 3 is disconnected and the resources that were consumed by User 3 are reclaimed by the resource manager 38. If the system resource usage reaches 80 percent or higher, only User 1 remains connected.

When multiple users with the same QoA level are connected to the Internet, the resource manager 38 preferably disconnects the users within the same level in a first-in-first-out manner.

Thus, the user that has been logged on the longest is disconnected first.

V. Modem Pool Management for Dial Applications

Another feature of the multi-service network switch of FIG. 1 is the ability to dynamically allocate system resources to incoming connection requests. Resources are not tied to specific ports, but may be shared among the various cards on a needed basis.

Figure 14:
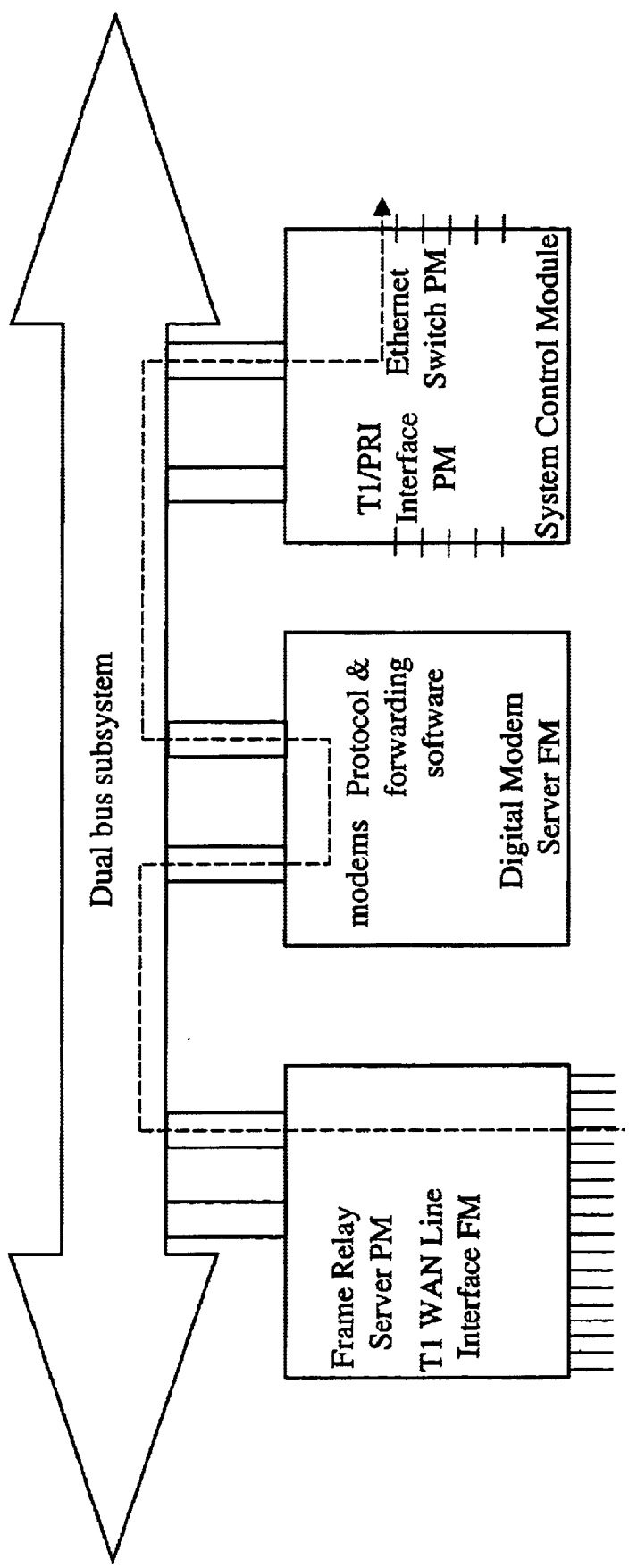
FIG. 14 is an illustration of a path that a connection might take if switch resources are being shared.

FIG. 14 illustrates the path that a connection might take if resources are being shared. In the example of FIG. 14, the connection is a modem call that arrives as a DS0 on one port of a T1 WAN line interface FM 380. The FM has no modems of its own, so the resource manager 38 locates an available modem and routes the DS0 over the TDM bus 18 to the digital modem server FM 382. After demodulation, the resulting packets are processed as appropriate and forwarded over the cell bus 20 to an output FM 384.

According to one embodiment of the invention, the resource manager 38 resident in each FM 10 is responsible for allocation and management of system resources. The resource manager preferably keeps a table of local resources and broadcasts this information to all other FMs 10 in the system. Each FM 10 then has a complete view of the total resources available or in use in the switch. The resource manager 38 is also preferably responsible for monitoring the health of local resources. For example, suspect modems may be marked as being unavailable and put out-of-service.

FIG. 15 is a schematic layout diagram of a modem resource table 334 maintained by the resource manager 38 according to one embodiment of the invention. Similar tables are also preferably maintained for ISDN and other system resources.

The resource manager 38 tracks available modem resources in the modem resource table 334 by both QoA level and virtual router (VR). Thus, the table 334 includes a VR ID field 336 identifying the virtual router for whom modem resources are being tracked. A maximum local resources field 338 indicates a maximum number of modems allocated to the VR on the FM 10. A value of zero for this field may indicate that the FM 10 is not a modem module. A maximum global resources field 340 indicates a maximum number of modems on the entire switch that have been allocated to the VR.

A current local resources field 342 indicates a current number of modems available to the VR on the FM 10. The difference between this number and the number from the maximum local resources field 338 indicates the number of modems in use by the VR on the FM 10. A current global resources field 344 indicates that the number of modems in use by the VR on the entire switch. The difference between this number and the number from the maximum global resources field 340 indicates the number of modems in use by the VR on the entire switch.

A QoA field 346 indicates the QoA levels supported by the switch. According to one embodiment of the invention, the switch supports four QoA levels, with level one being of highest priority.

A local QoA field 348 indicates the number of modems available in the FM 10 for the listed QoA class for the VR indicated. In the example of FIG. 15, level one QoA accesses the switch when there are zero or more modems available (100% of the time), level two QoA accesses the shelf when there are 8 or more modems available (75% of the time), level three QoA accesses the switch when there are 16 or more modems available (50% of the time), and level four QoA accesses the switch when there are 24 or more modems available (25% of the time).

A global QoA field 350 provides similar information as the local QoA field 348, but for the entire switch. Thus, the global QoA field 350 indicates the number of modems available in the entire switch for the listed QoA class for the VR indicated.

An accept local field 352 indicates whether each of the listed QoA levels may access the FM 10 based on the number of local resources available as indicated by the current local resources field 342. The valid values are preferably yes and no. The yes and no values are calculated dynamically so that as resources are consumed, the yes values may change to no values, with the exception of the level one QoA, which always is allowed access.

An accept global field 354 provides similar information as the accept local field 352, but for the entire switch. Thus, the accept global field 354 indicates whether each of the listed QoA levels may access the switch based on the number of global resources available as indicated by the current global resources field 344.

Figure 16:
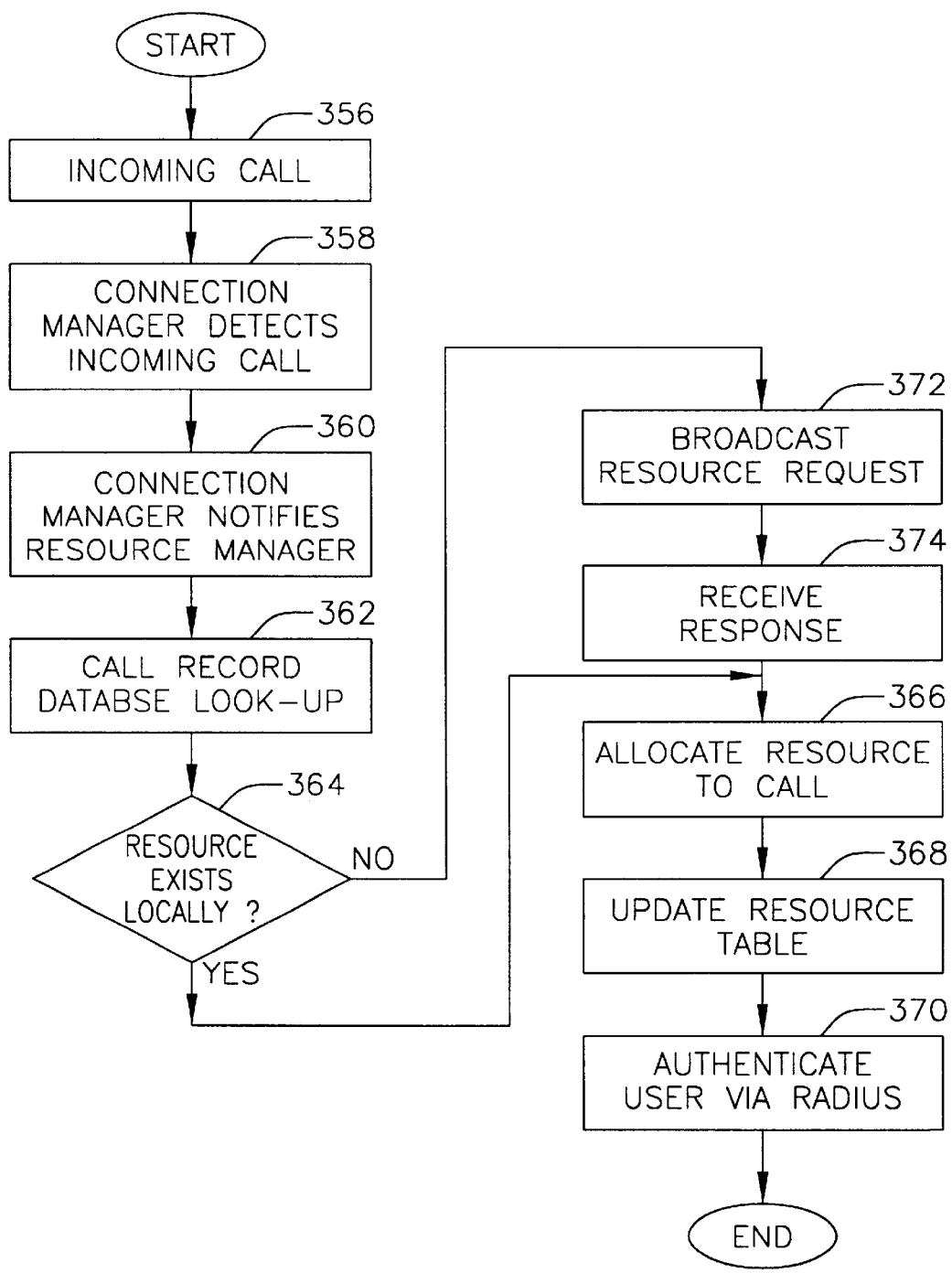
FIG. 16 is a flow diagram of a resource allocation process.

FIG. 16 is a flow diagram of a resource allocation process according to one embodiment of the invention. When a user initiates a connection request in step 356, the connection manager 46 detects the incoming connection request in step 358 via one of the interface lines, and in step 360, notifies the resource manager 38 residing in the FM 10 receiving the request (the receiving FM). In step 362, the resource manager 38 retrieves the appropriate call policy record 290 from the call policy database based on the characteristics of the connection request. The retrieved call policy record includes, among other things, the type of call, QoA level and the VR ID associated with the call.

Based on the type of call, the resource manager 38 determines the type of resource to allocate to the call. For instance, if the call is an ISDN call, ISDN resources are allocated. On the other hand, if the call is a modem call, modem resources are allocated.

In step 364, the program inquires whether the identified resource resides locally in the receiving FM 10. If the answer is YES, the resource manager 38, in step 366, allocates the identified resource to the call based on the identified VR ID and QoA level. In step 368, the resource manager 38 proceeds to update its local resource table 334 indicating the allocation of the identified resource. Furthermore, the resource manager 38 in the receiving FM 10 transmits a broadcast message indicating that the identified resource has been allocated, allowing each of the other resource managers to also update their respective resource tables. In step 370, the user is authenticated, preferably via the ISP's authentication server, and may now start transmitting and receiving data packets.

Referring back to step 364, if the identified resource does not exist locally, the resource manager 38 broadcasts, in step 372, a resource request including the QoA level and VR ID associated with the incoming call. The resource managers 38 in the other FMs 10 receive the request and examine their local resource tables 334 for determining if there is a resource available for the specified QoA level and VR ID. If there is, the receiving FM 10, in step 374, receives a messages from each FM 10 indicating availability of the requested resource. According to one embodiment of the invention, the first FM 10 to respond to the connection request is assigned the call, and the other responses are ignored.

In allocating the resource to the call, as reflected in step 366, the connection manager 46 of the receiving FM 10 broadcasts a connection request to connect to the resource in the first responding FM 10. The connection manager 46 in the responding FM 10 then responds with a message that the call has been connected. According to one embodiment of the invention, the responding FM 10 allocates a modem from its local pool starting sequentially with the modem on port one. The next call the responding FM 10 takes goes to port 2, then port 3, and so on. If a call is hung up on port 1 or port 2 before port 3 takes a call, ports 1 and 2 remain idle, and the third call is still allocated to port 3. If a modem port is in use and this port is the next one that would normally answer the call, the allocation of the port becomes randomized and any subsequent port may answer the call.

If there are no resources available that match the specified QoA and VR ID, the connection manager 46 in the receiving FM 10 causes the call to be terminated.

If a call has been connected and allocated a resource, and if the call is to be terminated, the interface line transmitting the call receives a request to disconnect the call, and it informs the connection manager 46. If the call has been allocated a local resource from the receiving FM 10, the call is locally terminated and the resource allocated to the call is returned to the free pool. All resource managers 38 then update their resource tables to reflect that the resource has become available.

If the call has been allocated a resource from a different card, the connection manager 46 in the receiving FM 10 broadcasts a request to disconnect the resource. The connection manager 46 in the FM 10 that allocated the resource then proceeds to disconnect the call. The connection manager 46 in the FM 10 that allocated the resource then broadcasts a message informing that the call has been disconnected. The resource is then returned to the free pool and the resource manager on each FM 10 updates their resource tables to reflect that the resource has become available.

VI. Multiple Virtual Routers

Another feature of the multi-service network switch of FIG. 1 is the ability to partition the switch into multiple virtual routers (VRs) where each VR has allocated to it a set of resources (e.g. ISDN or modem resources) and routing tables. Thus, each VR functions as a separate router in an independent and self-contained manner.

The system's approach to resource management enables the efficient provisioning of VRs. As described above, system resources are not tied to a particular slot or interface, allowing them to be flexibly partitioned among the various VRs.

According to one embodiment of the invention, a default system router is created at system boot-up. This router is preferably always present in the system, and all resources initially belong to the system router until they are reassigned to the VRs.

A system administrator may create new VRs and assign resources to the VRs. The system administrator may also perform routing configurations for the VRs.

A new VR is preferably created by assigning it a unique name and a unique VR ID. The new VR is then configured by setting-up its physical interfaces, IP interfaces, and enabling its routing protocols. Once configured, the VR is then enabled and may thus function as an independent router.

Specifically, a portion of the resources available to the system are allocated to the newly created VR. Such resources may include dial modem, ISDN, T1, PRI, Ethernet, and/or frame relay resources. Ethernet resources are partitioned on a per PM basis. Thus, each VP either has the entire Ethernet switch PM 12a or none at all. PRI and T1 resources are partitioned at the DS0 level. Frame relay resources are partitioned at the PVC (permanent virtual circuit) level.

Each VR is also allocated a number of modem and ISDN resources in the dial-up pool. According to one embodiment of the invention, each VR is allocated some fixed percentage or some fixed number of the pool. The resource manager 38 monitors the usage of the resources for each VR for each QoA level. When a call is received, the resource manager 38 identifies the VR ID of the incoming call and dynamically allocates the modem or ISDN resources if it is within the limits set for the VR and the user's QoA.

Figure 17:
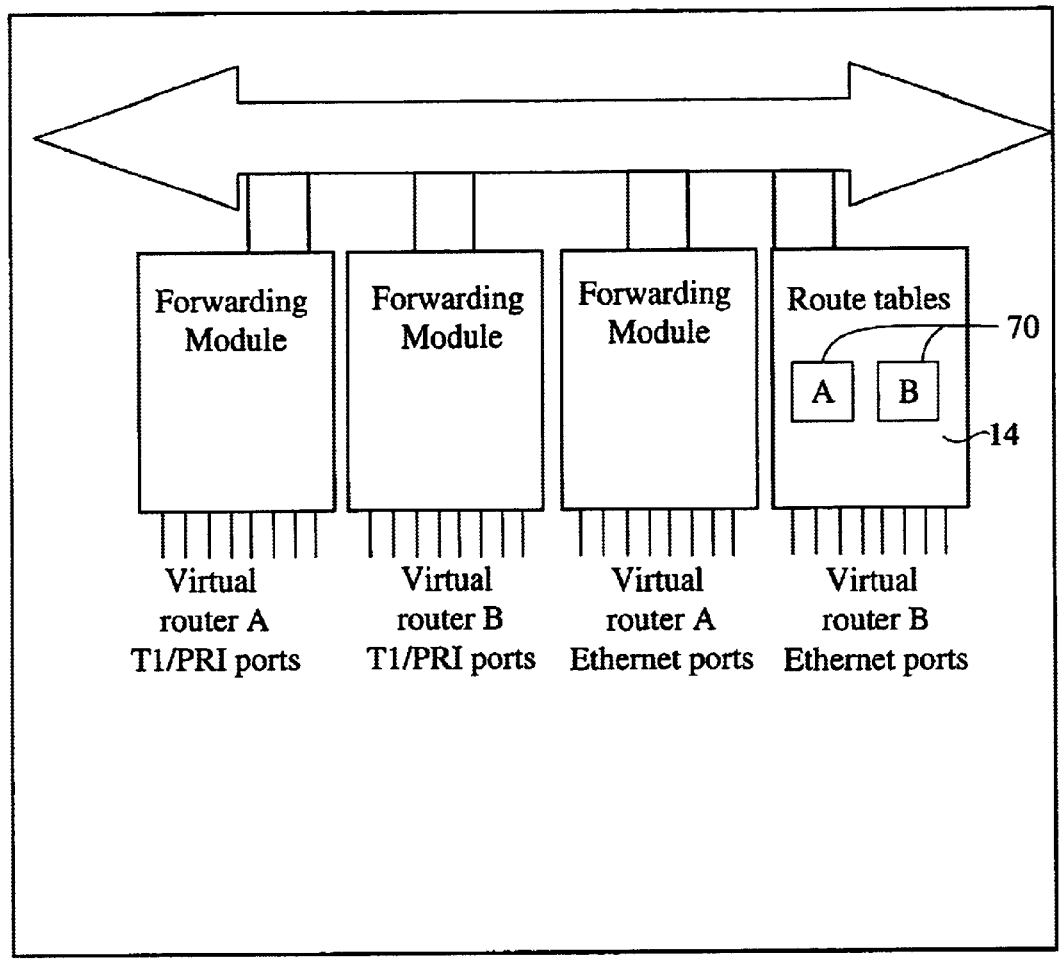
FIG. 17 is a schematic block diagram of the switch of FIG. 1 maintaining a routing table for each virtual router.

In addition, each VR has an instance of an IP protocol stack and its own routing table 70 for routing protocols including RIP, OSPF, GBP4, and the like. The SCM 14 thus maintains a routing table 70 for each VR according to the VR ID as is illustrated in FIG. 17. In addition, each VR has its own forwarding table 90 and IP cache 102 for forwarding IP packets which are also maintained based on the VR ID.

Each VR may further be partitioned into multiple virtual private networks (VPNs) for controlling access to certain portions of the VR. Access is controlled by filtering software that filters traffic directed to the VR based on criteria such as source and/or destination addresses.

According to one embodiment of the invention, VPNs consist of VPN sessions, VPN rules, and VPN filters. VPN sessions are a set of criteria that the switch compares against traffic in the network. VPN rules determine how the packets that match the VPN session are to be processed. VPN filters bind VPN sessions to VPN rules.

FIG. 18 is a schematic layout diagram of a sessions table 240 including various VPN sessions according to one embodiment of the invention. Each VPN session of FIG. 18 includes a session ID 242 for classifying a particular session. Because sessions are consulted in numerical order, the session ID 242 also preferably indicates the order in which sessions in the sessions table 240 are compared to packets. For example, session 1 is compared first, then session 2, and so on. If a packet does not match one of the sessions, it proceeds through the list to the next session.

Each session preferably also includes a VPN ID 244 for classifying and categorizing dial-up connections. For instance, one group of users may constitute a company's employees with a specific VPN ID 244 who may be given access to the company's network as well as to the Internet, and a second group of users may constitute customers with a different VPN ID 244 who may be given access to the Internet, but not to the company's network. In one embodiment of the invention, each user's VPN ID is configured in the ISP's authentication server.

Each session also includes an IP source address 246 and destination address 250 pair to match against packets transmitted and received in the network. A source comparison mask 248 and a destination comparison mask 250 allow the specification of a subnet, a group of hosts, or all addresses. In this way, the switch identifies the packets that are candidates for the filtering process.

For example, a session ID 242 of "1," VPN ID 244 of "111," source address 246 of "any," source comparison mask 248 of "any," a destination address of "10.1.0.0," and a destination comparison mask 252 of "255.255.0.0" indicates a VPN session "1" for users with a VPN ID of "111" (e.g. company employees), and allows them to come from anywhere on any source address, and access any subnet on the 10.1.0.0 network (e.g. the company LAN). On the other hand, a session ID 242 of "2," VPN ID 244 of "any," source comparison mask 248 of "255.255.0.0," destination address of "208.277.214.0," and destination comparison mask 252 of "255.255.255.0" indicates a VPN session "2" for any user (VPN ID "any") on any subnet on the 10.1.0.0 network (e.g. the company LAN) to access network 207.221.211.0 (e.g. the dial-up pool for accessing the Internet). In these examples, packets are compared against each session in ascending numerical order based on the session ID. Thus, if a packet does not match against session ID 242 "1," it is then compared against session ID "2."

Once a packet is targeted for filtering, the VPN rules specify a set of conditions about how the packet is to be processed. The rule may specify that the packet is to be forwarded, or that the packet is to be dropped.

FIG. 19 is a schematic layout diagram of a rules table 254 including various VPN rules according to one embodiment of the invention. Each VPN rule includes a rule ID 256 for identifying the conditions in the rule. Each VPN rule also includes a rule priority 258 indicating the order in which the rules are applied for a packet that matches a particular VPN session. An action field 260 indicates the action that the rule is to perform on the packet. Valid actions preferably include forwarding or dropping the packets.

Each session further includes an IP protocol field 262 and an application layer protocol field 264. The IP protocol field indicates the name of the IP protocol that is to be filtered. The application layer protocol field 264 indicates the application layer protocol that delivered the packet to the VPN.

A session count field 266 indicates the number of VPN sessions that use the rule. A packet count field 268 indicates the number of packets that are forwarded or dropped by the switch.

The VPN filter is preferably the entity that binds a VPN session to a VPN rule. Thus, when a packet is identified for filtering based on the criteria in the session table 240, the software consults the rule associated with the session from the rules table 254, and the rule determines whether the packet proceeds through the network.

FIG. 20 is a schematic layout diagram of a filter table 270 including various VPN filters according to one embodiment of the invention. Each filter includes a session 272 and a rule 274 that is bound to the session 272. The session 272 corresponds to the session ID 242 in the session table 240, and the rule 274 corresponds to the rule ID 256 in the rules table 254.

When a media port receives a packet, it determines whether it needs to be filtered. If so, it is passed to a filtering module for carrying-out the appropriate filtering process. According to one embodiment of the invention, the filtering module resides in each FM 10.

Figure 21:
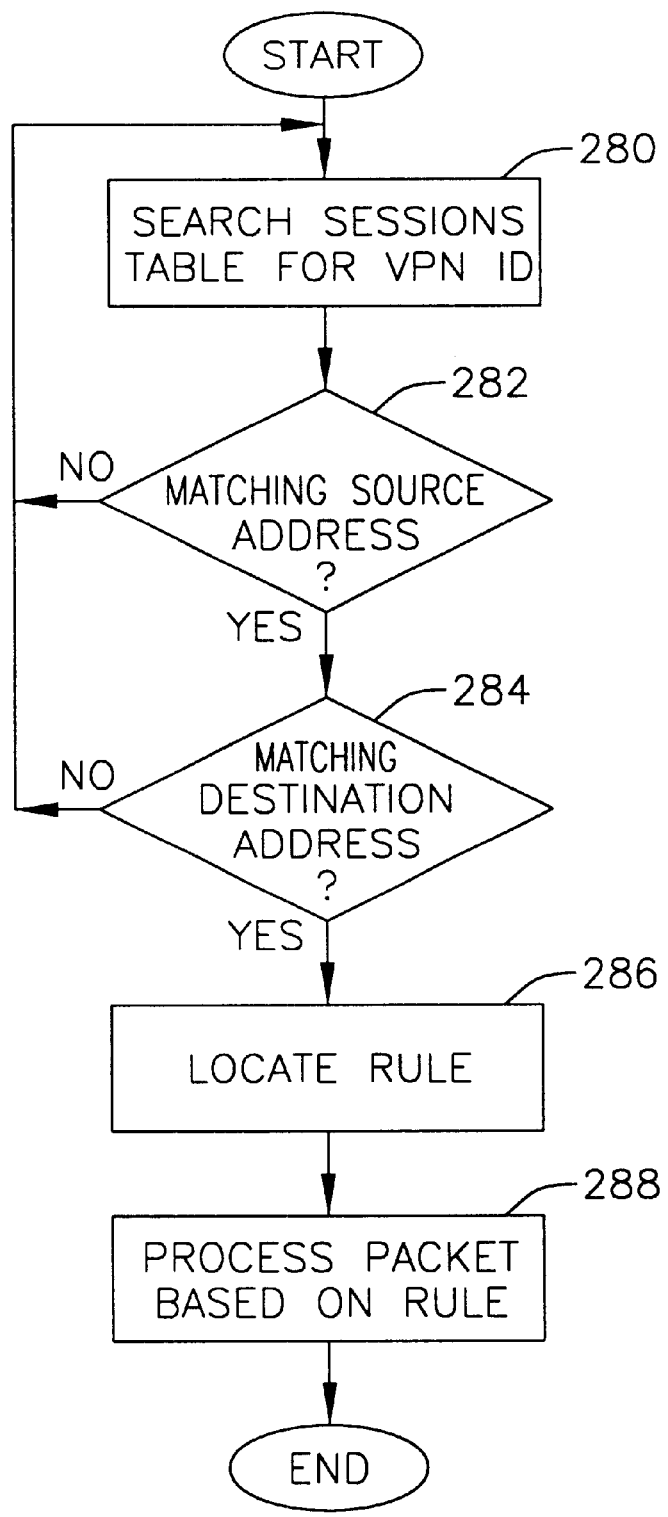
FIG. 21 is a flow diagram of a packet filtering process engaged by a filtering module.

FIG. 21 is a flow diagram of a packet filtering process engaged by the filtering module according to one embodiment of the invention. Each packet to be filtered includes a VPN ID. Thus, the program starts, and in step 280 locates the VPN ID in the packet. The program also searches the sessions table 240 for the appropriate VPN ID 244. The program searches the sessions table 240 in ascending numerical order based on the session ID 242. Once the program locates a session matching the VPN ID, the program, in step 282, inquires whether the packet's source address matches the source address 246 specified for the session. If the answer is YES, the program inquires in step 284 whether the packet's destination address matches the destination address 250 specified for the session. If the answer is again YES, the program, in step 286, searches the filter table 270 for the rule corresponding to the matched session. In step 288, the program searches the rules table 254 for determining the conditions specified for the rule, and processes the packet (i.e. forwards or drops the packet) based on these conditions.

VII. Automatic Protection Switching

Another feature of the multi-service network switch of FIG. 1 is its ability to provide fault tolerance through automatic protection switching (APS) hardware and software. APS allows component failures within the switch (e.g. terminating equipment failures) and external link failures to be isolated and service be restored via backup components. Thus, if terminating equipment or an external link goes down, each is automatically rerouted to a backup component without interruption in service.

There are two elements to a connection, an external link and terminating equipment connecting to the external link. Thus, APS is preferably divided into two areas, one area dealing with fault isolation and automatic recovery for terminal equipment failures, and the other area dealing with fault isolation and automatic recovery for external link failures.

The switch preferably supports any combination of primary and backup components. For example, the backup may be a port on the same module (card), another module within the same shelf, another module in a different shelf but within the same rack, or another module in another shelf in another rack.

Figure 22:
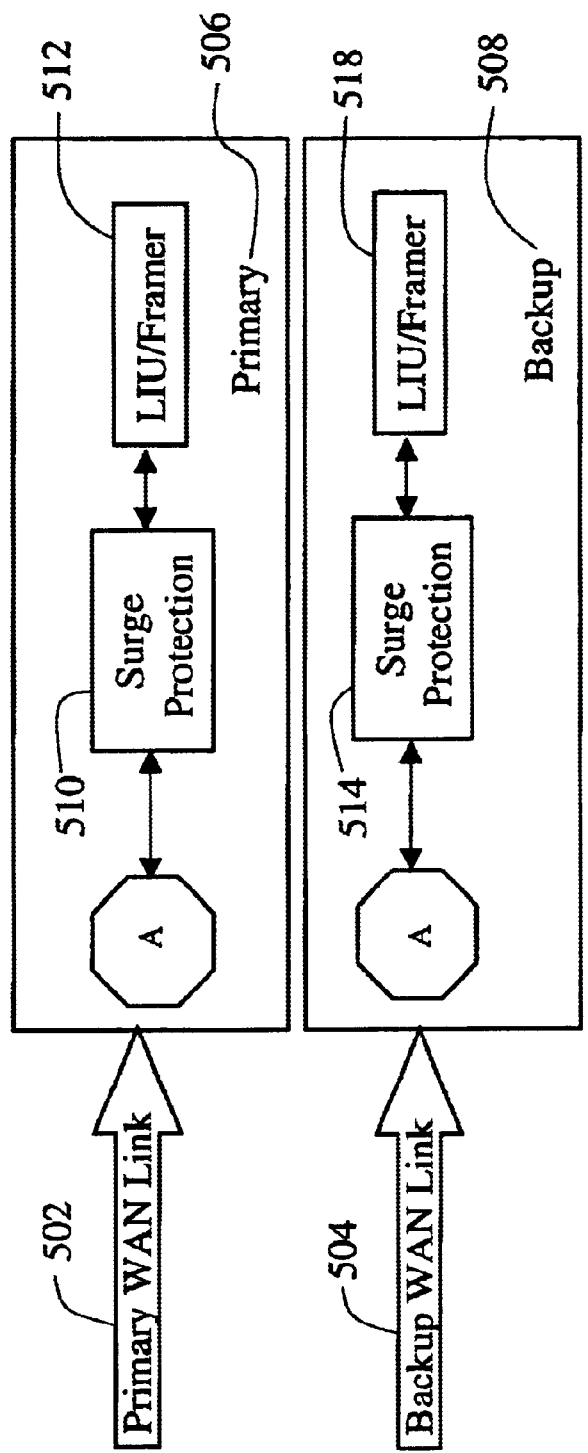
FIG. 22 is a schematic block diagram of a switch incorporating an APS mechanism for external link failures.

FIG. 22 is a schematic block diagram of a switch incorporating an APS mechanism for external link failures. The switch includes a primary module 506 and a backup module 508 where the primary module accepts a primary WAN link 502 and the backup module accepts a backup WAN link 504. Both the primary and backup modules include surge protection equipment 510, 514, and a line interface unit (LIU)/framer 512, 518. The same data received by the primary WAN link 502 is also preferably received by the secondary WAN link 504. If software detects errors on the primary WAN link 502, such as transmission errors, the APS software shifts the reading from the primary WAN link to the backup link 504. The shift from the primary WAN link to the backup link is preferably instantaneous, without creating any interruption to system functionality.

According to one embodiment of the invention, the backup WAN link 504 is selected from a redundant port list (RPL). The redundant port list provides a user-defined list of backup links for each link in the system. The backup link may be of the same type or different type than the primary. For example, an ISDN connection could have a fractional-T1 link as a backup.

The switch further provides an APS mechanism for terminal equipment failures such as faulty modules or faulty ports. According to one embodiment of the invention, there are two ways for protecting terminal equipment. One way is having two or more ports in a card, where each primary port is protected by a backup port. Thus, when a primary port goes down, a backup port takes over. Another way involves having two or more cards, where each primary card is protected by a backup card. Thus, when one card goes down, the other card takes over and processes the data.

Figure 23:
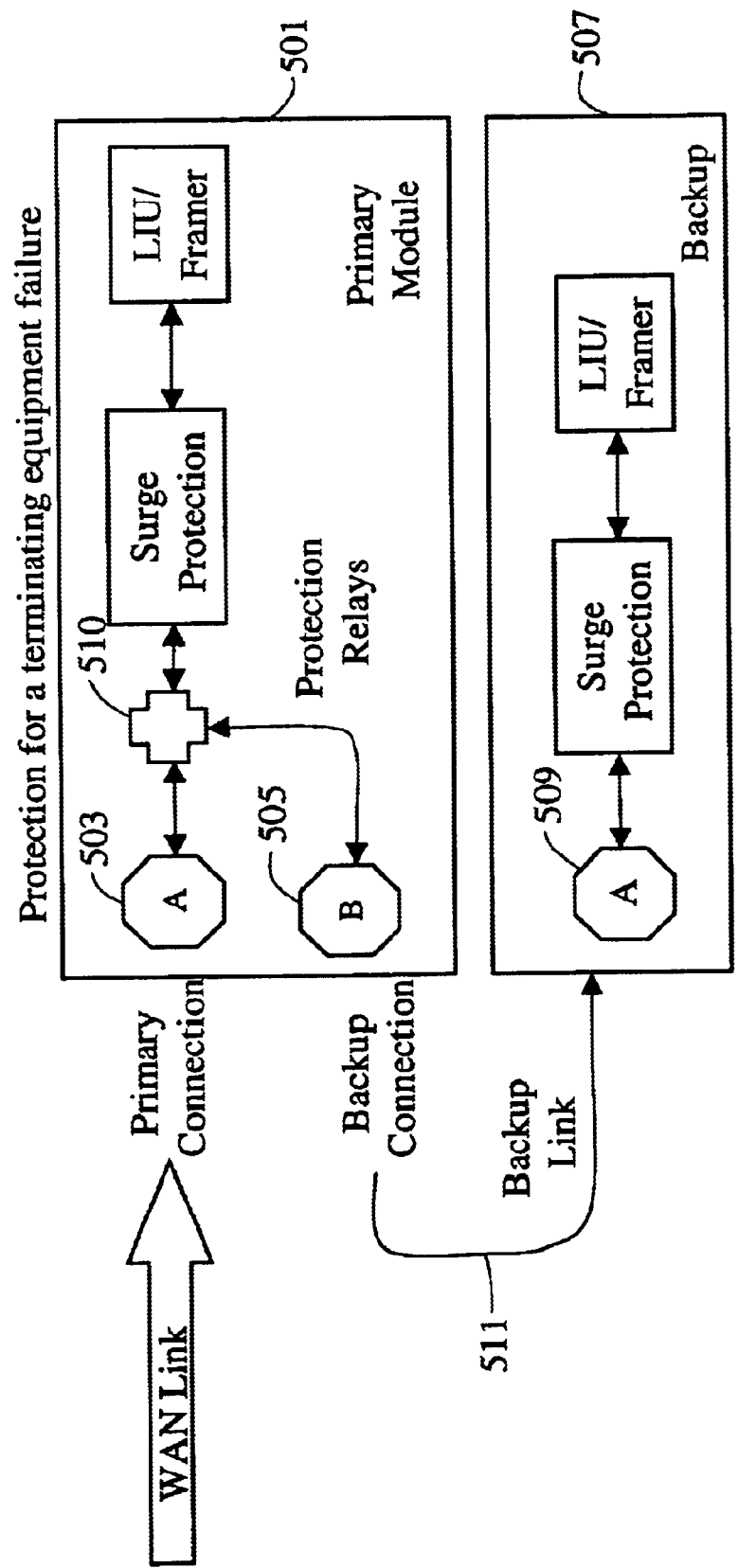
FIG. 23 is a schematic block diagram of a switch incorporating a backup port that is physically connected to another port on a separate card.

FIG. 23 is a schematic block diagram of a switch incorporating a backup port that is physically connected to another port on a separate card. A primary module 501 includes a primary port 503 and a backup port 505. The backup port 505 is physically connected to another port 509 on a backup module 507 via a backup link 511. When a fault is detected on the primary port 503, the relay diverts traffic to the backup port 505 which in turn directs the traffic to the port 509 on the backup module 507.

According to one embodiment of the invention, a fault on the primary port 503 is detected via hardware by monitoring the activity of the port. If there is no activity (e.g. no change) on the port after a programmed period of time (e.g. 290 milliseconds), the protection relay 510 automatically switches to the backup port 505. The APS software keeps the data in the backup port 505 up-to-date with the primary port. Thus, when there is a switch from the primary port to the backup port, no loss of data is contemplated. If the backup port is on the same card, then the same memory is used. If the backup port is on a different backup card, the APS software preferably writes the data to both cards at the same time.

The APS architecture is preferably a 1:n architecture where each backup component supports n primary components, where n is greater or equal to one. For example, a 1:2 protection switching indicates that one backup component exists for every two primary components. According to one embodiment of the invention, the switch offers a choice of 1:1, 1:2, 1:3, and 1:4 protection switching for T1/E1 links, and a choice of 1:1 and 1:2 protection switching for CT3 links (E3,T3, and channelized OC3).

Figure 24:
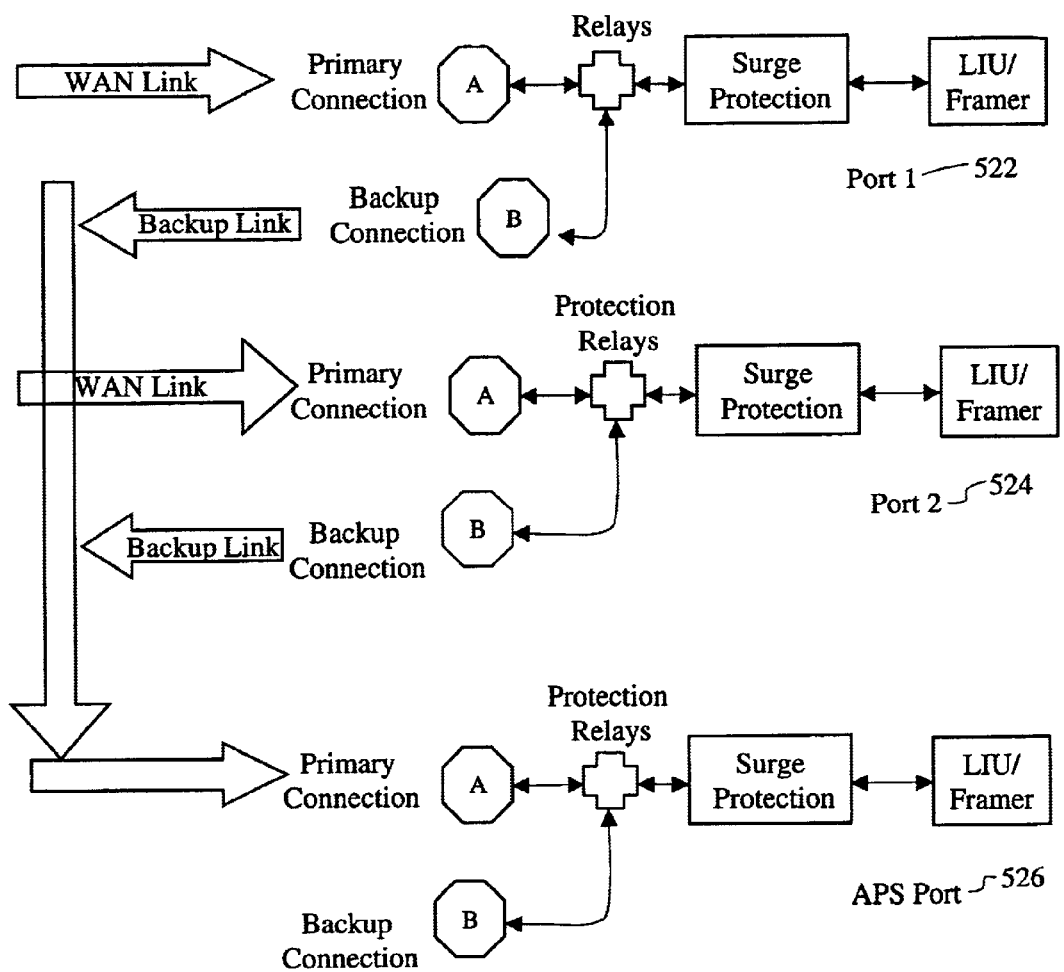
FIG. 24 is a schematic block diagram of a switch incorporating a 1:2 protection switching.

FIG. 24 is a schematic block diagram of a switch incorporating a 1:2 protection switching according to one embodiment of the invention. Port number one 522 and port number two 524 are both connected to a common backup port 526. Port number one 522 is connected to the backup port 526 via backup link 528, and port number two is connected to the backup port via backup link 530. Such 1:2 protection switching enables either of the two working links to be switched to the protection circuitry.

Figure 25:
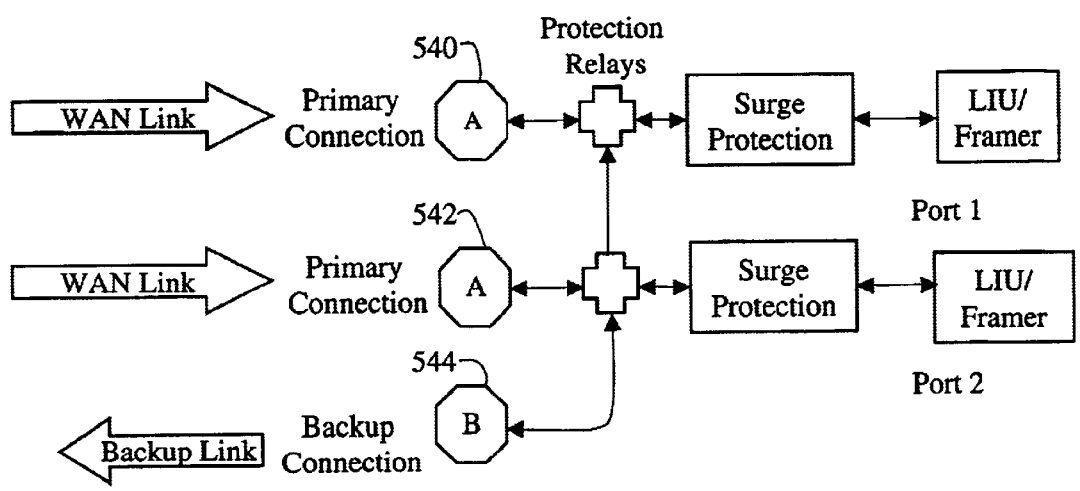
FIG. 25 is a schematic block diagram of a switch incorporating a 1:2 protection switching according to an alternative embodiment of the invention.

FIG. 25 is a schematic block diagram of a switch incorporating a 1:2 protection switching according to an alternative embodiment of the present invention. Port 1 has a first primary connection 540 and port 2 has a second primary connection 542. Instead of each port having its own backup connection, like in the embodiment of FIG. 24, both port 1 and port 2 share a backup connection 544.

Figure 26:
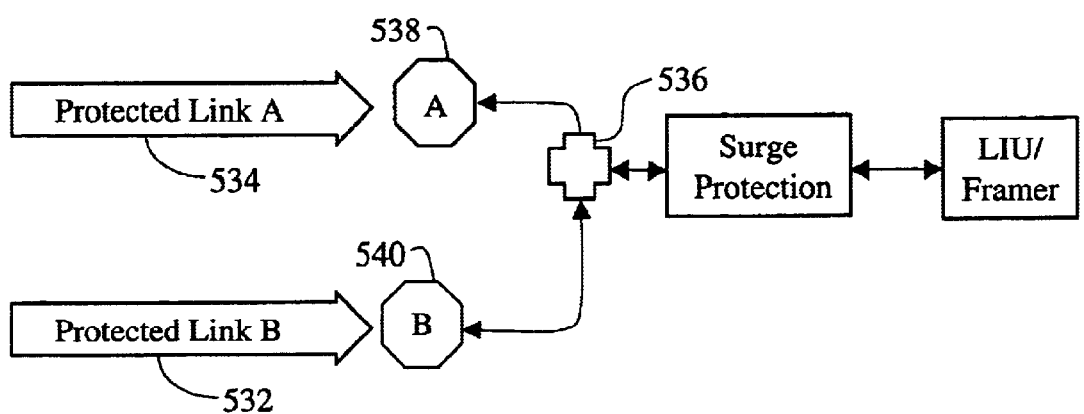
FIG. 26 is a schematic block diagram of a switch incorporating a 1:1 protection switching.

FIG. 26 is a schematic block diagram of another embodiment incorporating a 1:1 protection switching. External link B 532 acts as a backup for external link A 534. According to this embodiment, LIU and other logic is switched to either port A 538 or port B 540 via a selection relay 536. Thus, if external link A 534 goes down, the relay 536 switches to port B 540 for reading data from the external link B 532.

VIII. Modular, Independent Protocol Stack Architecture

Another feature of the multi-service network switch of FIG. 1 is its ability to support an IP routing protocol and architecture in which the layer two protocols are independent of the physical interfaces they run on. In contrast to known switch technology that attaches a protocol to a physical port at compile time, the switch preferably configures a port with the appropriate protocol when the port is activated, that is, dynamically after a connection is made, allowing switch applications to be independent from the physical ports on which they run.

The switch preferably supports a variety of wide area network (WAN) and local area network (LAN) physical interfaces. These physical interfaces include modem, ISDN, T1 and fractional T1(T1/FT1), unchannelized T3(UT3), ATM OC3, ATM DS3, and Ethernet. The switch also supports a variety of layer two protocols including point-to-point protocol (PPP), PPP over frame relay (PPP/FR), PPP over Ethernet (PPOE), layer two tunneling protocol (L2TP), layer two forwarding (L2F), RFC 1483 Bridged, RFC 1483 Routed, RFC 1490 Bridged, and RFC 1490.

With the flexibility to dynamically configure a port, a single port may support an L2TP for one session and a L2F for another session. In addition, the same protocol may be run on different ports for each session. For instance, PPP typically comes over modem. However, with dynamic configuration of ports, PPP may also be run over Ethernet, T1, or ISDN lines, without being restricted to a single type of physical interface. Furthermore, the switch is not only capable of processing different types of packets from different types of media, but is also capable of forwarding the packets to any kind of media. For example, data can come into the switch via PPP and go out over ATM.

The dynamic configuration of ports may further be extended to a variety of media, such as narrow band for voice, broadband and DSL, to name a few. A port can also be dedicated such as for T1. The software architecture enables modules for disparate media to communicate with one another all in one switch.

Figure 27:
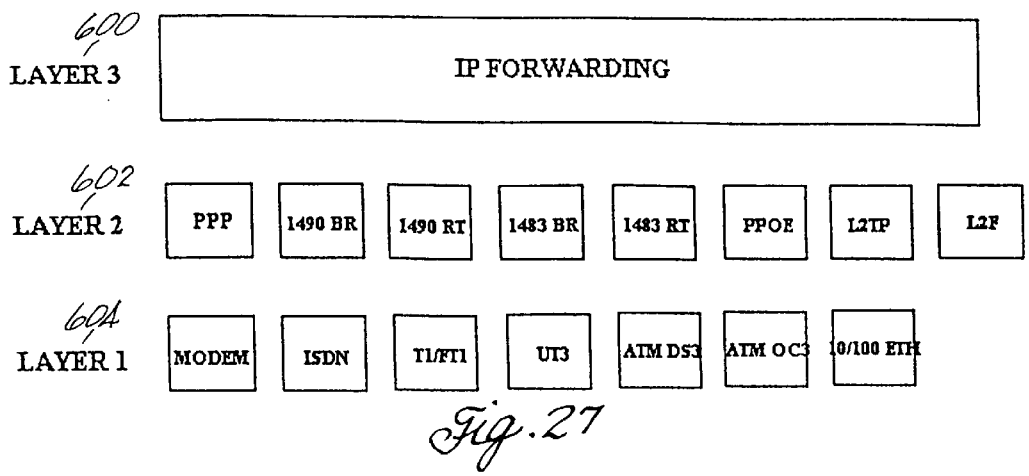
FIG. 27 is a schematic block diagram of an IP forwarding layer, layer two protocols, and layer one physical interfaces.

FIG. 27 is a schematic block diagram of an IP forwarding layer 600, layer two protocols 602, and layer one physical interfaces 604. The dynamic configuration of ports allows, for example, PPP to be bonded to modem, ISDN, T1, UT3, ATM DS3, and ATM OC3. In addition, layer two protocols 602 may be dynamically linked together to create a new layer two protocol. The new layer two protocol may then be bonded to a layer one interface 604.

According to one embodiment of the invention, the port interface (PIF) 122 (FIG. 4) enables dynamic bonding of layer two protocols to layer one protocols. When a media port becomes active, the switch creates a PIF object for the port. Preferably, PIFs are created by the GFI 124 (FIG. 4) software, triggered by the media driver 118. The PIF object determines the layer two protocol to be utilized for the current session based on the type of connection, and the GFI software dynamically bonds the layer two protocol to the layer one interface of the media port. The protocol is linked for the duration of the session.

Figure 28:
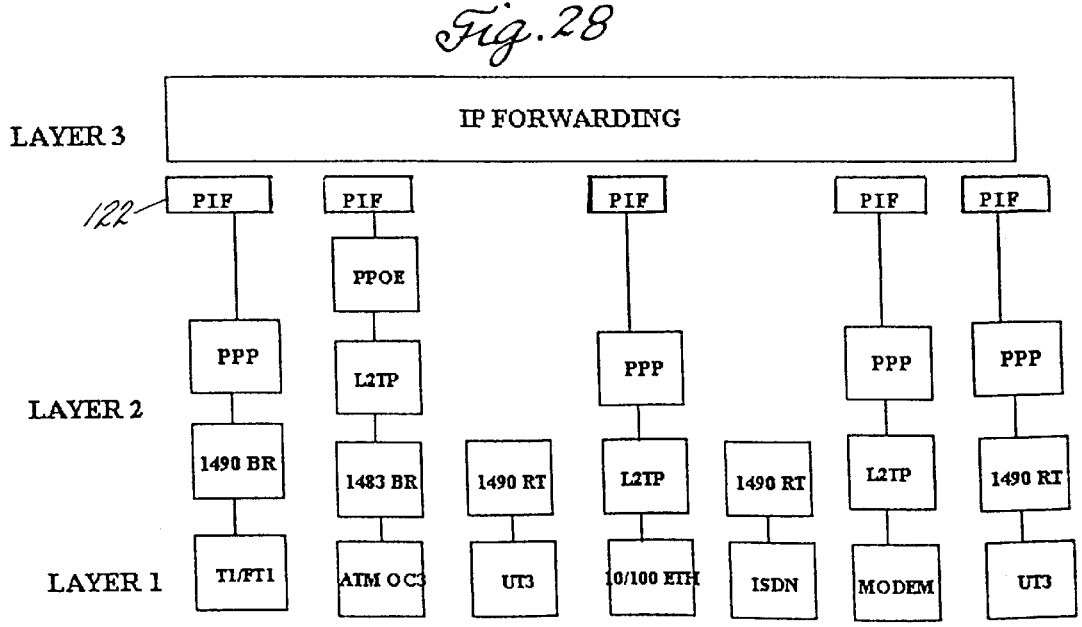
FIG. 28 is a schematic block diagram showing layer one, two, and three interfaces with multiple port interfaces.

FIG. 28 is a schematic block diagram showing layer one, two, and three interfaces with multiple PIFs 122, a PIF for every port. When a port is activated, the media driver 118 preferably creates a PIF structure/module storing specific media and packet format information for the port including port type, encapsulation, state information (e.g. active or inactive), and different port numbers (e.g. physical port address, forwarding port address, and the back-plane port address). The PIF also keeps track of the status of the PIF and reports changes to the FTAM, maintains statistics of the ports, and maintains a pointer to the currently dialed-in user for dial-up ports.

According to one embodiment of the invention, the PIF structures are maintained as two dimensional arrays using the controller number and the port number as the index. In order to locate a particular PIF of a port, both the controller number and the port number within that controller are used.

The PIFs for all the physical ports are preferably created when the card comes up. The PIFs are initially in an inactive state. As the ports become active the PIF states are changed to an active state. For dial-in ports, the PIF is put into an active state when a user dials in through that port. When the call is disconnected, the PIF is put into an inactive state. The PIF is preferably not removed because the PIF structure also keeps the port statistics and it is useful to keep the port statistics even after the user is disconnected.

A port up message is sent by all the LAN cards to the SCM whenever a port changes its state from an inactive state to an active state. The WAN cards do not normally send the port up message to the SCM. The port up message is preferably sent by a WAN port if that port is configured to carry the routing protocol update messages like RIP and OSPF packets.

A port down message is sent to all the cards in the chassis whenever a port's state changes from an active state to an inactive state. The cards, after receiving this message, remove the entries in the forwarding table and ARP table which refer to the port as being down.

The PIF module on the SCM is also responsible for maintaining and managing the RPL. For each of the physical ports, the user can set up another physical port as the backup port. The backup port is preferably not be part of any LPI.

The backup port is used when the primary port goes down. All the packets are normally sent to the primary port. The backup port is held in a disabled state. Packets are neither received nor transmitted from the backup port when the primary port is active. When the primary port goes down, the PIF module on the SCM enables the backup port and all the packets from then on are sent on to the backup port. According to one embodiment of the invention, when the primary port comes up again, the backup port is again put into disabled state and all the packets again are sent to the primary port. Alternatively, the packets continue using the backup port for the remainder of the session and do not switch to the primary port.

In an alternative embodiment of the invention, the RPL is maintained in a distributed manner. The RPL is distributed by the SCM to each card when the card comes up as part of its initialization. Each of the cards maintain the backup port in the disabled state. When the primary port goes down, an RPL port down message is sent to all the cards. When the cards receive the RPL port down message, each card searches its RPL table for determining whether one of their ports is the backup port. If it is, then that card puts the port into an enabled state and starts handling traffic on that port. Also, all the cards remove all the entries in the forwarding table and ARP table which refer to the primary port. From then on, all the traffic starts flowing onto the backup port. When the primary port comes back up, an RPL port up message is sent to all the cards. The card which has the backup port puts the port into a disabled state and sends a port down message for the backup port to all the cards. The port down message causes all the cards to remove the forwarding table and ARP table entries which refer to the backup port. From then on, the primary port becomes active again. The RPL table is synchronized on all the cards. Whenever a change is made to the RPL table, it is distributed to all the cards by the SCM.

The IP Forwarder 44 (FIG. 4) interfaces to the PIF object and sends and receives packets to/from the PIF via the logical port identifier (LPI) 128. A logical port identifier (LPI) 128 communicates with the PIF 122 and includes the IP parameters related to each physical port. The IP layer calls an LPI transmit function whenever it wants to transmit a packet. The LPI transmit function identifies the appropriate physical port and passes the packet to the PIF 122 for adding the media specific layer two encapsulation headers and transmitting it out the appropriate port.

After the initial packet has been processed, the identified layer two encapsulation headers are preferably stored in an IP cache entry. This allows the IP Forwarder to bypass the PIF and Layer two functions for subsequent packets, minimizing packet processing overhead. Thus, for all subsequent packets, layer two encapsulation headers are taken from the IP cache entry.

IX. Generic Forwarding Interface

Another feature of the multi-service network switch of FIG. 1 is the ability to provide a uniform interface to the forwarding functions to mask the details of transmitting and receiving packets over different interface types. This is preferably done via the generic forwarding interface (GFI) 122 (FIG. 4) that enables applications (e.g. IP forwarder, PPP, and other functions provided by the switch) to send and receive packets in a generic format.

According to one embodiment of the invention, GFI handles all internal packet forwarding, either between ports on the same FM 10 or across the bus to other FMs 10 in the switch. GFI preferably makes forwarding functions transparent regardless of whether a packet is forwarded to a remote card or a local card. Furthermore, forwarding functions are transparent regardless of the ingress and egress ports used for the packet. For example, an ingress port may be frame relay over ISDN and the associated egress port may be switched to a frame relay circuit without going through the IP forwarder module 44 (FIG. 4).

Figure 29:
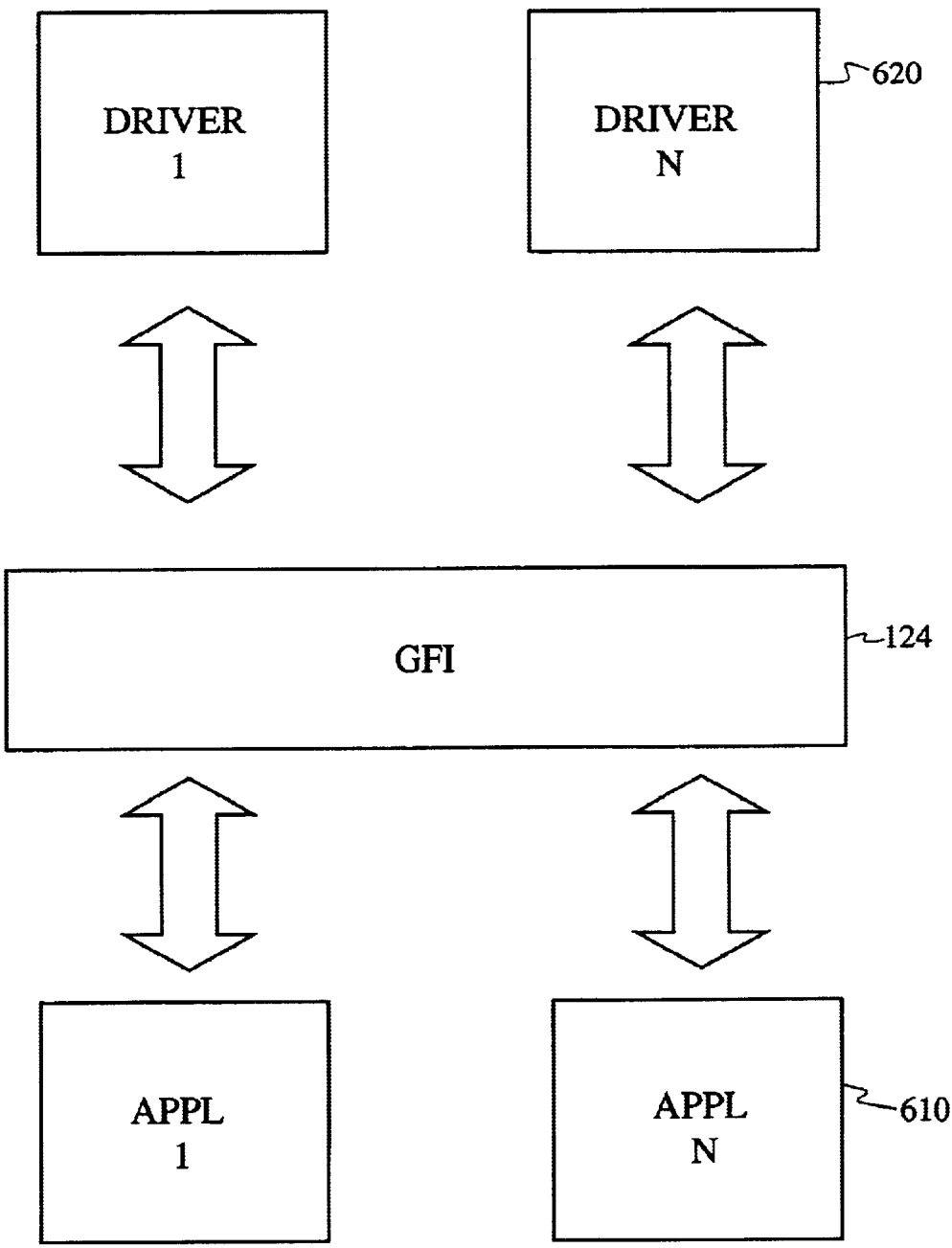
FIG. 29 is a schematic block diagram of a generic forwarding interface dividing the switch of FIG. 1 into drivers and applications.

GFI 124 provides protocol transparency by dividing the switch into drivers 620 and applications 610 as is illustrated in FIG. 29. Applications 610 are preferably bonded to drivers 620 at run time. This allows applications and drivers to be attached and detached dynamically, providing flexibility to the port. This dynamic bonding also frees memory and processing resources not needed for unused protocols.

Applications and drivers desiring to receive and forward packets register various functions with the GFI, including receiving functions, forwarding functions, and/or polling functions. Drivers 620 preferably register their forwarding functions for forwarding packets to a physical port. If a packet is to be forwarded to a physical port, GFI invokes the forwarding function that is registered by the driver of the port.

Applications 610 preferably register their receiving functions with GFI to receive and process incoming packets. Receiver functions are registered to service various types of packets including packets that have been received through media ports, packets that have been forwarded, and packets destined to known internal ports. A protocol processing or forwarding application such as PPP or IP forwarder typically registers with GFI to receive and process packets received through the media ports. Forwarded packets are processed by applications that perform translation and encapsulation for a particular output port. Receiver functions also register with GFI to handle packets destined to known internal ports, such as a management channel that is used to exchange external management information.

Both applications 610 and drivers 620 may register polling functions with the GFI for periodic invocation. Polling functions are often used to check the operation of the switch. In a preferred embodiment of the invention, two levels of polling frequency may be specified: high and low. Preferably, foreground functions such as packet processing preferably uses high frequency polling, while the background functions such as timer processes use low frequency polling. In alternative embodiments of the invention, multiple levels of polling frequency may be used.

When a packet arrives into the system through a media port, the packet is received by one or more buffers (GFI buffers) in the shared memory 24 (FIG. 2). The driver associated with the media port receives the packet and translates it into a generic format using GFI utilities. The driver also builds a GFI descriptor that defines the packet, and has pointers to buffers that belong to the packet. The packet is then passed onto the system for processing by the applications.

When a packet is to be transmitted to a physical port, GFI invokes the appropriate driver's forwarding function to transmit the packet. The driver's forwarding function is preferably responsible for translating the generic packet into the driver's specific format and transmitting it out the required port.

Figure 30:
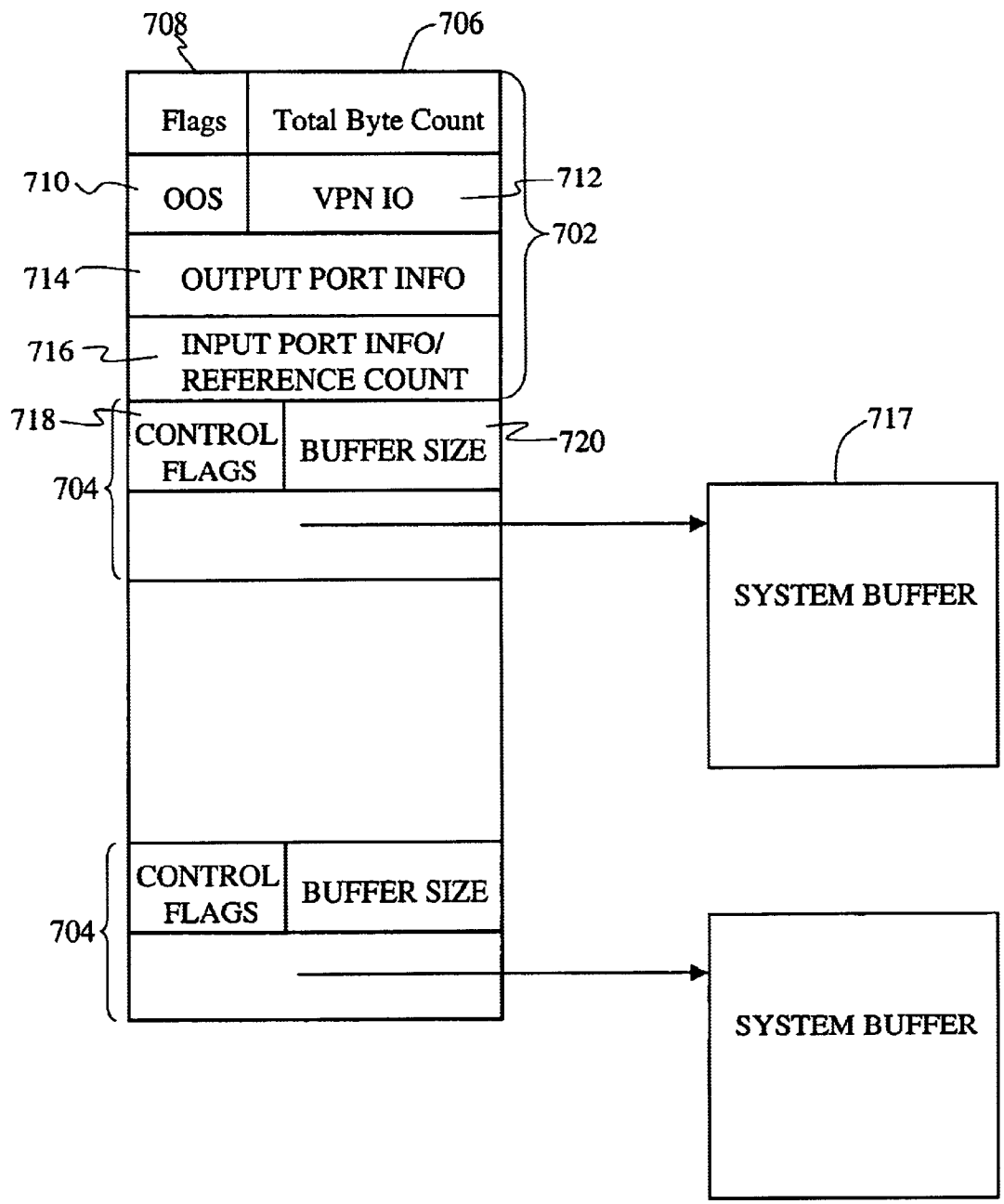
FIG. 30 is a schematic block diagram of a generic packet format.

All packets introduced into the system are preferably converted to a generic packet format (GPF) for protocol transparency. FIG. 30 is a schematic block diagram of a GPF 700 according to one embodiment of the invention. The GPF 700 preferably includes a list of shared memory buffers and a descriptor that points to the buffers. The descriptor is divided into a general packet descriptor (GPD) 702 and one or more buffer descriptors 704. The GPD preferably includes four words. In one embodiment, the first word of the GPD includes a total byte count 706 for the packet as well as various routing flags 708. The routing flags include flags for fragmentation, multicast, switched, and monitored. In this embodiment, the total byte count is the length of a packet.

The second word defines a QoS value 710 and VPN ID 712. The VPN ID identifies a virtual private network associated with the packet. The QoS value identifies the level of priority for processing the packet. In a preferred embodiment of the invention, GFI provides eight levels of QoS. Once a packet is assigned a QoS value, GFI ensures that the packet is serviced throughout the system based on its QoS. GFI also allocates resources such as CPU, backplane, communication channel, and system buffers to the packets based on their QoS values.

The third word specifies an output port information 714. The output port information is preferably filled in after the packet's routing information has been determined from a lookup in the IP forwarder module 44.

The fourth word identifies an input port 716 receiving the packet. The fourth word also includes a reference count for multicasting. The reference count is used by drivers to keep track of a packet that is being transmitted to multiple ports.

The buffer descriptor preferably includes a buffer control word and a pointer to a system buffer 717. The buffer control word includes control information 718 as well as the number of bytes of data 720 in the buffer. The control information includes control flags that define the type of buffer.

A port addressing scheme used for the input port 714 and output port information 716 enables forwarding of packets anywhere in the switch. The port addressing scheme is preferably hierarchical and it is based on chassis, cards, controllers, and ports. Moreover, ports are divided into five categories: local ports, internal multicast ports, internal unicast ports, external multicast ports, and remote ports. According to one embodiment of the invention, GFI provides two different types of port addressing schemes, a forwarding port address (FPA) and a physical port address (PPA). FIG. 31 is a schematic layout diagram of an FPA according to one embodiment of the invention. FPA is preferably used for forwarding packets throughout the switch. FIG. 32 is a schematic layout diagram of a PPA according to one embodiment of the invention. The PPA is preferably used for external use, for administrative purposes, and for configuring ports within a switch.

GFI preferably provides two types of FPA, a local FPA and a backplane FPA. The local FPA is used to direct packets to local media drivers. The backplane FPA is used to direct packets to remote ports Forwarding of packets is based on controller number for both local FPA and backplane FPA. Every device on the card preferably has a controller number 601. For example, there is an Ethernet controller for an Ethernet device and there is an ISDN controller for an ISDN device. The controller number is part of the FPA. The controller number allows the GFI to dispatch the packet to the appropriate driver. According to one embodiment of the invention, the controller number has local significance only. If there are four drivers on one card, then there are four different controller numbers allocated to the four drivers so that the GFI can dispatch packets to them.

There is also a controller for the backplane driver. The backplane driver preferably uses controller number zero. The backplane is another driver that runs under the GFI. Backplane packets do not go out of the switch. They go to another card in the switch. All the packets which are to be forwarded to other cards within the switch are sent to the backplane driver. If a packet has to go to another card, then the controller number is changed, allowing the packet to be sent to a remote port. The scheme includes address ranges that determine the type of port.

The backplane also includes an address range. When sending a packet from one card to another card such as a packet coming into the switch from a modem and going to another card in frame relay, the packet is redirected to the backplane by changing the controller number to zero. Packets directed to remote ports are directed to the backplane driver. When the packet is received at the other card, the controller address is switched to frame relay.

When a driver receives a packet from a port, it constructs a GPD 702 for the packet. In doing so, the driver preferably constructs the input port 716 information as illustrated in FIG. 33. The input port 716 information includes 8 flag bits and 24 address bits. The flag bits specify source control information that permits the receiving application to apply appropriate routing and encapsulation.

The output port information 714 is preferably built after the packet's routing information is obtained from the forwarding module 44. FIG. 34 is a schematic layout diagram of the output port information according to one embodiment of the invention. The output port information 714 includes 8 flag bits and 24 address bits. The 8-bit flag field is used as control information that is passed from the application to the drivers that is responsible for transmitting the packet.

The output port information is preferably designed so that applications can send a packet to a local port address (LPA), known internal multicast (WKIM) address, known internal unicast (WKIU) address, known external multicast (WKEM) address, dynamic external multicast(DEM) address, and remote port address (RPA).

If a packet is being forwarded to a local port (i.e. local to the card), the output port specifies the physical port address as illustrated in FIG. 32. Local ports that are visible to the other cards are mapped to backplane driver ports. The backplane driver ports are used to direct packets to remote ports. The backplane driver maps port addresses in the incoming packets to local port addresses.

WKIM addresses provide internal communication paths between applications on various modules. For example, if an application running on the ISDN module wants to send a message to the management IP stack running on the SCM, it uses the appropriate WKIM address assigned to the SCM's IP stack. In the case where there are multiple SCMs in the system, the message is sent to the IP management stack of all the SCMs. If the user wants to address a known internal port within a card, then the WKIU is to be used.

A WKEM is used to group a host of external ports together. For example, a WKEM is setup for any application, such as OSPF, that requires broadcasting to a list of ports. A DEM capability allows the user to create and destroy multicast groups on the fly.

If an application on one card wants to send a packet to an external port on another card, it uses the RPA assigned to that port. Before a remote port can be addressed there is a mapping of the RPA to a physical port address. Each card in the system is responsible for mapping its own physical ports to RPAs. In the preferred embodiment of the invention, utilities in a header file perform the required mapping.

With the exception of the local port address, all of the above categories of addresses are preferably virtual addresses. A virtual port address maps to one or more physical port addresses. The virtual address port assignments according to one embodiment of the invention are illustrated in FIG. 35. Preferably, controller number 0 is assigned to the virtual addresses. In a preferred embodiment of the invention, the backplane address ranges are as follows:

| | |
|---|---|
| 0 | Reserved for Known internal management channel |
| 1–7167 | Dynamic port range (remote port address) |
| 7168–7368 | Known internal unicast ports |
| 7369–7568 | Known internal multicast ports |
| 7569–7668 | Known external multicast ports |
| 7669–8191 | Dynamic multicast ports |

The known internal multicast is used to direct packets to the internal applications that run on multiple cards. Examples include OSPF, RIP, and call log. Known external multicast is used to direct packets to a group of ports for a known application. Examples are ports used by routing protocols such as OSPF, RIP, and BGP4. Dynamic multicast is used by application protocols that require dynamic creation and deletion of multicast groups. In a dynamic multicast, members can be added and deleted dynamically. IP multicast is one example of a dynamic multicast.

Another function provided by GFI is distributed multicasting. To send a packet to a multicast group, only one packet is created. When the packet is sent to a multicast group, the packet is sent to the backplane. Then, the packet is propagated to the multicast group. When recipients get the packet, it gets propagated in the recipient card to the appropriate media ports without having to copy the packet.

GFI further provides hardware configuration transparency. For example, the number of CPUs and the DMA capability is transparent to the applications. The memory layout between platforms can be completely different from card to card. The GFI makes it transparent to applications. Therefore, applications are not concerned with drivers and memory. The specifics of a board is determined at run time. The GFI moves all data structures into the appropriate places based on the GFI's configuration. When GFI is activated, it calls a generic platform function to initialize the platform. The generic platform function gets the parameters for a platform. The platform function detects what kind of board/card it is and what type of memory it is and then sets up the data structures and memory accordingly. Parameters passed by the function determine shared memory configuration, buffer size. For example, a parameter representing a modem buffer size of 256 k bytes may be passed back to the GFI. There is a platform function for every card. Thus, the same code can run on different cards.

The GFI software is designed to run on different hardware platforms. For example, the GFI runs on all Personality-Modules as well as all Generic Hardware Modules (i.e. High Speed Generic Module, Low Speed Generic Module, etc.). Once a driver is implemented based on the GFI interface, it can move from platform to platform without any modification. Moreover, the GFI makes the CPU configuration (i.e. one CPU or two CPUs) of the system transparent to the applications and drivers. No changes are required to the drivers and applications when moving from a single CPU configuration to a multiple CPU configuration, and vice versa.

When processing packets in a single CPU platform, GFI goes through a receive queue and checks the code set in the packet descriptor. GFI further checks if there is any application registered to receive the packet. The applications register with the GFI at initialization time. If there is an application registered to receive the packet, GFI invokes the application that has been registered and gives the packet descriptor to the application.

In a multiple CPU platform, there is a queuing CPU and an application CPU. The queuing CPU does the queuing and the application CPU does the processing. A macro puts the packet in a QoS queue based on the QoS level that has been set in the packet descriptor for the application CPU to process. The GFI code makes the number of CPU configuration transparent. Whether the GFI is running on one CPU or two CPUs, it does not matter to the driver that invokes the GFI receive function. The GFI puts a packet into a queue if running on a two CPU platform or it invokes the function directly on a single CPU platform.

When a packet is passed to an application. The application can: (1) forward the packet; (2) drop the packet; or (3) hold the packet. When the application is called, it returns any of the above codes to the GFI.

One application is the IP forwarder module 44 who gets the IP packet and makes forwarding decisions regarding the packet. Once the forwarding decision is made, the IP forwarder module sets up the destination GFI address in the packet descriptor and returns a forward code. If the IP forwarder module determines that the packet is not good or cannot be processed, then it returns a drop code to the GFI that the packet be dropped. If the IP forwarder module determines that the packet is to be held, the module transfers the packet later because the routing information has not yet been determined.

If the forward code is returned and the GFI is running on a dual CPU environment, the GFI queues the packet in the queuing CPU. If it is running on a single CPU, the GFI calls the dispatch function for GFI directly. The dispatch function decides based on which driver this packet has to go to and it dispatches the packet to the appropriate transmit function to be sent out.

When GFI runs on a two CPU platform, a set of queues are set up automatically, receive queues and forwarding queues. In one embodiment of the invention, there are 4 receive queues and 4 forwarding queues. Each queue is used to differentiate a different level of QoS. The GFI picks up the packet from the queue and processes it based on the QoS and then calls the dispatch function, then dispatches the packet for the appropriate driver transmit function. Which driver transmit function is called depends upon the forwarding port address that is in the packet descriptor. The forwarding port address has a controller number and the controller number determines the driver that is to receive the packet.

Figure 36:
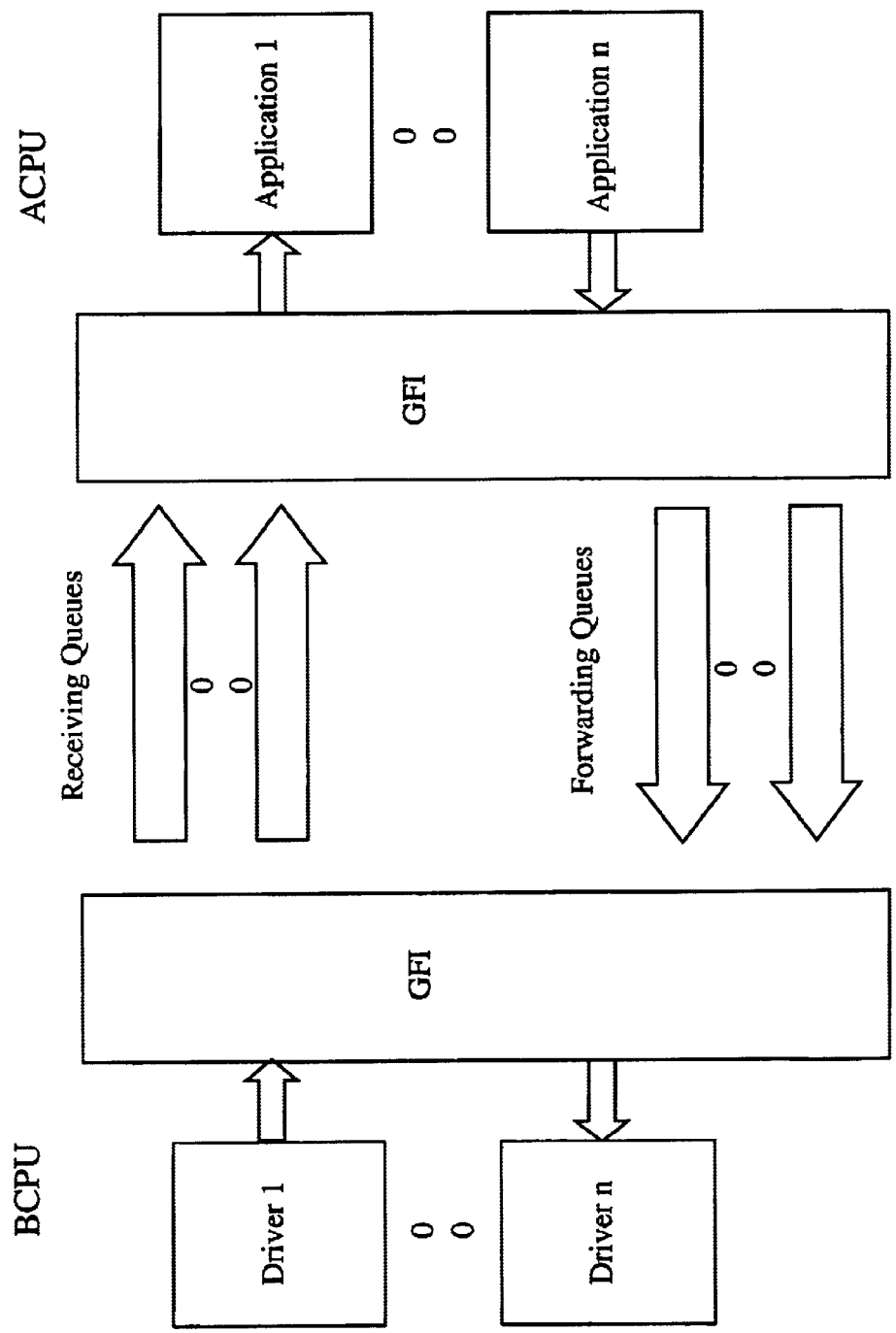
FIG. 36 is a schematic layout diagram of a generic forwarding interface supporting receiving queues and forwarding queues.

In an alternative embodiment of the invention, the GFI supports 8 Receiving Queues (RQs) and 8 Forwarding Queues (FQs). FIG. 36 is a schematic layout diagram of the Receiving Queues and Forwarding Queues according to one embodiment of the invention. When the driver receives a packet, it uses the packet's assigned QoS value to queue it to any of the 8 RQs. Similarly, when an application is forwarding a packet, it uses the QOS value to queue the packet to any of 8 FQs.

The above queuing scheme is preferably only used for the two CPU configuration. When the GFI runs on a single CPU configuration the forwarding and receiving queues are not created or used. The GFI makes this transparent to users.

GFI further provides Inter-Processor Communication (IPC). Using the IPC capability, applications running on different processors on the same card can exchange messages. In order to receive messages through the IPC an application registers with the IPC using the function calls provided in the gfi-ipc.h. The IPC provides two modes of operations: synchronous and asynchronous. Using the synchronous mode, an application can send a message to a client running on another CPU and wait for the response. The IPC provides the mechanism for the responder to send a message to the requester when the synchronous mode of operation is used. If an application does not require explicit acknowledgment of a message, then it uses the asynchronous mode of operation. In this case, the IPC queues the message and returns immediately back to the application.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the appended claims and their equivalents.

What is claimed is:

1. In a multi-service network switch, a method for emulating multiple routers within the single switch, the method comprising:

creating a plurality of virtual routers, each virtual router being associated with a unique virtual router identifier;

allocating resources to each virtual router, the allocated resources being proprietary to each virtual router;

creating a routing table for each virtual router;

setting an IP interface for each virtual router;

enabling each virtual router;

receiving a connection request at a first interface module;

identifying the virtual router for the connection request;

determining a resource needed for the connection;

determining availability of the resource for the virtual router at the first interface module;

communicating a request for a resource from the first interface module to a second interface module;

receiving a response from the second interface module indicating that the resource is available; and assigning the resource to the connection request.

2. The method of claim 1, wherein the allocating resources to each virtual router comprises allocating a percentage of resources from a pool of available resources.

3. The method of claim 1 further comprising monitoring usage of resources allocated to each virtual router.

4. The method of claim 1, wherein the monitoring comprises monitoring usage of resources allocated to each virtual router based on a quality of access level, the quality of access level being associated with an access threshold indicative of a maximum number of resources allowed to be in use before a resource is allocated to a connection request.

5. The method of claim 1 further comprising creating for each virtual router a set of filters, each filter being associated with a filtering criteria and an action to be taken upon a match of the filtering criteria by a block of data directed to the virtual router.

6. The method of claim 5, wherein the filtering criteria is based on a source address of the block of data.

7. The method of claim 5, wherein the filtering criteria is based on a destination address of the block of data.

8. The method of claim 5, wherein the action to be taken is forwarding the block of data.

9. The method of claim 5, wherein the action to be taken is dropping the block of data.

10. The method of claim 5 further comprising assigning priorities to the filters, the priorities determining an order in which the filters are applied.

11. A multi-service network switch comprising:

a plurality of interface modules receiving and forwarding data blocks, each interface module including a plurality of resources;

means for creating a plurality of virtual routers, each virtual router being associated with a unique virtual router identifier;

means for allocating a portion of the resources to each virtual router, the allocated resources being proprietary to each virtual router;

means for monitoring usage of resources allocated to each virtual router;

a first interface module receiving a connection request, identifying the virtual router for the connection request, determining a resource needed for the connection, determining availability of the resource for the virtual router, and communicating a request for the resource; and a second interface module receiving the request for the resource, determining availability of the resource for the virtual router, communicating a response indicating that the resource is available, and assigning the resource to the connection request.

12. The switch of claim 11, wherein the means for monitoring comprises means for monitoring usage of resources allocated to each virtual router based on a quality of access level, the quality of access level being associated with an access threshold indicative of a maximum number of resources allowed to be in use before a resource is allocated to the connection request.

13. The switch of claim 11 further comprising means for creating for each virtual router a set of filters, each filter being associated with a filtering criteria and an action to be taken upon a match of the filtering criteria by a block of data directed to the virtual router.

14. The switch of claim 11 further comprising means for assigning priorities to the filters, the priorities determining an order in which the filters are to the applied.

15. A multi-service network switch comprising:

a plurality of interface modules receiving and forwarding blocks of data, each interface module including a plurality of resources, a portion of the resources being allocated to a virtual router;

means for receiving a connection request directed to the virtual router;

means for assigning a resource to the connection request from the portion of resources allocated to the virtual router;

means for receiving a block of data from the connection;

means for locating a filter associated with the block of data, the filter including a filtering criteria and an action to be taken upon a match of the filtering criteria; and means for processing the block of data based on the located filter.

16. The switch of claim 15, wherein the filtering criteria is based on a source address of the block of data.

17. The switch of claim 15, wherein the filtering criteria is based on a destination address of the block of data.

18. The switch of claim 15, wherein the action to be taken is forwarding the block of data.

19. The switch of claim 15, wherein the action to be taken is dropping the block of data.

* * * * *